(12) United States Patent
Ushida

(10) Patent No.: US 7,366,757 B1
(45) Date of Patent: Apr. 29, 2008

(54) COMMUNICATION APPARATUS, COMMUNICATION METHOD, COMMUNICATION SYSTEM, AND STORAGE MEDIUM

(75) Inventor: Katsutoshi Ushida, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 532 days.

(21) Appl. No.: 09/588,683

(22) Filed: Jun. 7, 2000

(30) Foreign Application Priority Data

| Jun. 11, 1999 | (JP) | .................................. 11-165942 |
| Jul. 1, 1999 | (JP) | .................................. 11-187937 |
| Jul. 1, 1999 | (JP) | .................................. 11-187938 |

(51) Int. Cl.
*G06F 15/16* (2006.01)
*H04N 1/00* (2006.01)
*H04N 1/32* (2006.01)
*H04M 11/00* (2006.01)

(52) U.S. Cl. ........................ 709/206; 358/402; 358/442; 379/93.24

(58) Field of Classification Search ................ 370/401; 379/93.24–100.15; 709/201–207; 358/402, 358/442

See application file for complete search history.

(56) References Cited

U.S. PATENT DOCUMENTS

| 5,247,591 A * | 9/1993 | Baran .......................... 382/179 |
| 5,647,002 A * | 7/1997 | Brunson ...................... 709/206 |
| 5,802,361 A * | 9/1998 | Wang et al. ................. 382/217 |
| 5,812,278 A | 9/1998 | Toyoda et al. .............. 358/402 |
| 5,911,776 A * | 6/1999 | Guck .......................... 709/217 |
| 6,020,980 A * | 2/2000 | Freeman ..................... 358/402 |
| 6,023,345 A * | 2/2000 | Bloomfield ................. 358/402 |
| 6,025,931 A * | 2/2000 | Bloomfield ................. 358/402 |
| 6,097,797 A * | 8/2000 | Oseto ..................... 379/100.08 |
| 6,124,947 A * | 9/2000 | Seo ............................ 358/405 |
| 6,144,464 A * | 11/2000 | Rupp et al. ................. 358/442 |
| 6,157,706 A * | 12/2000 | Rachelson ............. 379/100.08 |
| 6,208,426 B1* | 3/2001 | Saito et al. ................ 358/1.15 |
| 6,212,550 B1* | 4/2001 | Segur ......................... 709/206 |
| 6,223,216 B1* | 4/2001 | Nalder ....................... 709/217 |

(Continued)

FOREIGN PATENT DOCUMENTS

JP 06-350773 12/1994

(Continued)

OTHER PUBLICATIONS

Parsons et al., Tag Image File Format (TIFF)—image/tiff MIME Sub-type Registration, Mar. 1998, RFC 2302.*

(Continued)

*Primary Examiner*—Bunjob Jaroenchonwanit
*Assistant Examiner*—David England
(74) *Attorney, Agent, or Firm*—Fitzpatrick, Cella, Harper & Scinto

(57) ABSTRACT

Image data communication equivalent to facsimile communication using a public network is realized on e-mail communication. When a communication apparatus for transmitting/receiving e-mail data by connecting to the Internet is to communicate e-mail data having facsimile-format image data attached, communication concerning functional information is performed in addition to the communication of the e-mail data. The functional information can be exchanged by an optimum method matching the form of connection to the Internet. This allows maximum utilization of the capability of each apparatus function in facsimile image communication using e-mail.

42 Claims, 13 Drawing Sheets

U.S. PATENT DOCUMENTS

| | | | |
|---|---|---|---|
| 6,356,356 B1 * | 3/2002 | Miller et al. | 358/1.15 |
| 6,389,460 B1 * | 5/2002 | Stewart et al. | 709/217 |
| 6,411,685 B1 * | 6/2002 | O'Neal | 379/88.14 |
| 6,421,708 B2 * | 7/2002 | Bettis | 709/206 |
| 6,535,303 B1 * | 3/2003 | Wolf | 358/434 |
| 6,600,750 B1 * | 7/2003 | Joffe et al. | 370/401 |
| 6,693,729 B1 * | 2/2004 | Bloomfield | 358/402 |
| 2002/0059362 A1 | 5/2002 | Maeda | 709/203 |

FOREIGN PATENT DOCUMENTS

| | | |
|---|---|---|
| JP | 10-200579 | 7/1998 |
| JP | 10-271157 | 10/1998 |
| JP | 11-065963 | 3/1999 |
| JP | 11-112765 | 4/1999 |
| JP | 11-122458 | 4/1999 |
| JP | 11-127330 | 5/1999 |

OTHER PUBLICATIONS

Toyoda et al., A Simple Mode of Facsimile Using Internet Mail, Mar. 1998, RFC 2305.*

Parsons et al., Tag Image File Format (TIFF)—F Profile for Facsimile, Mar. 1998, RFC 2306.*

Masinter et al., Extended Facsimile Using Internet Mail, Mar. 1999, RFC 2532.*

* cited by examiner

FIG. 12

\*\*\*COMMUNICATION MANAGEMENT REPORT\*\*\*

| START TIME | OTHER PARTY | NUMBER | COMMUNICATION MODE | COMMUNICATION RESULT |
|---|---|---|---|---|
| 02/04 17:03 | 0450000001 | 0001 | TRANSMISSION | OK |
| 02/04 17:20 | 0440000002 | 0002 | TRANSMISSION | OK |
| 02/04 18:30 | 0470000001 | 0003 | ECM TRANSMISSION | NG #018 |
| 02/04 20:15 | 0520000001 | 0004 | TRANSMISSION | OK |
| 02/05 1:00 | 0471000001 | 5001 | TRANSMISSION (TIMER) | NG #021 |
| 02/05 2:00 | 0350000001 | 5002 | AUTOMATIC RECEPTION | OK |
| 02/05 3:05 | 0300000001 | 0005 | AUTOMATIC RECEPTION | OK |

FIG. 13

| START TIME | OTHER PARTY | NUMBER | COMMUNICATION MODE | COMMUNICATION RESULT |
|---|---|---|---|---|
| 02/04 17:03 | yyy@xxx.xx.xx | 0001 | MAIL TRANSMISSION | OK |
| 02/04 17:20 | zzz@xxx.xx.xx | 0002 | MAIL TRANSMISSION | BaseLine |
| 02/04 18:30 | aaa@yyy.yy.yy | 0003 | MAIL TRANSMISSION | NG #018 |
| 02/04 20:15 | bbb@yyy.yy.yy | 0004 | MAIL TRANSMISSION | OK |
| 02/05 1:00 | 0471000001 | 5001 | G3 TRANSMISSION (TIMER) | OK |
| 02/05 2:00 | 0350000001 | 5002 | G3 AUTOMATIC RECEPTION | OK |
| 02/05 3:05 | ccc@zzz.zz.zz | 0005 | RECEPTION | OK |
| 02/07 6:00 | 0520000001 | 5004 | G3 TRANSMISSION (ECM) | NG #021 |
| 02/07 7:05 | /ddd@zzz.zz.zz | 3012 | MAIL TRANSMISSION | OK |
| 02/07 9:00 | 0300000001 | 5005 | G4 TRANSMISSION | OK |
| 02/07 9:30 | 0300022222/ eee@zzz.zz.zz | 3013 | MAIL TRANSMISSION | G3 |

COMMUNICATION APPARATUS, COMMUNICATION METHOD, COMMUNICATION SYSTEM, AND STORAGE MEDIUM

FIELD OF THE INVENTION

The present invention relates to a communication apparatus, communication method, communication system, and storage medium capable of communicating e-mail data and G3/G4 facsimile data.

BACKGROUND OF THE INVENTION

G3 facsimile apparatuses based on ITU-T Recommendations T.30 exchange functional information pertaining to the capabilities of the apparatuses, e.g., a recording resolution, a printable main scan length, a sub-scan length, a coding scheme, a modulation scheme, a transmission rate, a sub-address, a password, and selective polling, by using DIC/DTC/DCS before transmission of documents. Therefore, if the functions of transmitting and receiving apparatuses are different, facsimile documents can be communicated by an optimum image format and communication method which both apparatuses have. Furthermore, facsimile services such as relay, broadcast, and polling can be performed by using the functions of sub-address, password, and selective polling.

To examine information about the result of communication performed by a facsimile apparatus, a communication result report shown in FIG. 12 is prepared. In facsimile communication, whether the communication is normally or abnormally terminated is known when the communication line is disconnected. Hence, a communication result is determined when a communication result report is output.

In communication apparatuses for communicating e-mail data, however, no means for exchanging information pertaining to such facsimile functional information is defined. Also, in e-mail data communication, no means for transmission acknowledgement (transmission result discriminating means) for indicating that transmission is reliably performed is defined.

Accordingly, to transmit e-mail by attaching facsimile-format image data, the general approach is to attach an image of a format, which is a base line (a minimum necessary function which a facsimile apparatus based on the ITU-T recommendations must have as essential capability) of G3 facsimile, to e-mail as image data of a TIFF format (a file format concerning raster image data developed by Aldus) by using, e.g., MIME or SMIME (an e-mail data format recommended by IETF). A coding scheme of the base-line image format is MH coding, its main scan resolution is 8 pels/mm, its sub-scan resolution is 3.85 lines/mm, and its original width is A4 208 mm.

If, therefore, the transmitting end transmits e-mail by attaching image data having higher resolutions, such as a main scan resolution of 16 pels/mm and a sub-scan resolution of 15.4 lines/mm, than the base line or by attaching image data of a large sheet size such as A3, it is unknown that the destination apparatus can process the received data. This makes it impossible to know whether the other party has reliably received the document.

Furthermore, since no means for communicating functional information concerning G3/G4 facsimile services is defined, facsimile services such as relay, broadcast, and polling cannot be used via e-mail communication.

SUMMARY OF THE INVENTION

The present invention has been made in consideration of the above situation, and the first object according to the present application is to provide, in a communication apparatus capable of communication in an e-mail form, means for exchanging information pertaining to functional information with the other party, image data converting means, and delivery confirmation exchanging means by using optimum means in accordance with the forms of connections to the Internet of apparatuses at both transmitting and receiving ends and with the installation state of an e-mail server, thereby realizing image data communication, equivalent to facsimile communication using a public (wide area) network, on e-mail communication.

It is the second object according to the present application to provide a user-friendly apparatus capable of transmitting image data by a base-line function even when the other party is an apparatus incapable of exchanging functional information on e-mail communication or even when functional information cannot be exchanged owing to, e.g., abnormality of a server or a network.

It is the third object according to the present application to perform common facsimile communication by using a public line, by giving up communication using the Internet, if functional information is unexchangeable with the other party, thereby realizing communication considering the maximum capability of the other party even when the other party is unable to exchange functional information on e-mail communication.

It is the fourth object according to the present application to reliably transmit image data even when an error occurs on e-mail communication and change the number of times of retransmission in accordance with the contents of the error, thereby accomplishing reliable distribution of e-mail data.

It is the fifth object according to the present application to improve the performance of an apparatus by performing no retransmission if retransmission is meaningless such as when the contents of delivery confirmation indicate a communication error due to the absence of a corresponding address.

It is the sixth object according to the present application to reliably inform the partner on e-mail of the occurrence of an error by transmitting error information as e-mail data to the destination apparatus or to the designated e-mail address, and to designate the other party to be notified of error information and thereby reliably notify the designated terminal of the error information even when there is no sender at the sending terminal.

It is the seventh object according to the present application to attach information about a transmitted image to e-mail data of error information, thereby allowing a user as a transmission source to readily verify which e-mail data has caused the error.

It is the eighth object according to the present application to improve user friendliness, even when a communication error occurs and the other party is a personal computer incapable of exchanging functional information, by designating whether transmission by conversion into base-line image data which the other party is most likely to be able to process or retransmission by the same format is to be performed, so that e-mail data is reliably transmitted to the other party.

It is the ninth object according to the present application to use, as the standards of an image as a base line, MH coding as a base-line coding system, a main scan resolution of 8 pels/mm, a sub-scan resolution of 3.85 lines/mm, and an original width of A4 208 mm, thereby increasing the probability of success of communication including attached image data, and obtaining communicability with a facsimile apparatus having standard functions.

It is the 10th object according to the present application to provide a function with a low communication cost by successively performing communication concerning functional information, communication of the text, and communication concerning delivery confirmation by a single call, when the charge required to connect to a provider is a fixed amount, rather than a usage based on the connecting time, or when charging by the provider is based on the number of times of connection.

It is the 11th object according to the present application to provide a function with a low communication cost by performing communication concerning functional information, communication of the text, and communication concerning delivery confirmation by separate calls, when the charge required to connect to a provider is based on the connecting time and the functional information communication and the delivery confirmation take time.

It is the 12th object according to the present application to always provide a function with a low communication cost to a user by allowing the user to selectively perform communication concerning functional information, communication of the text, and communication concerning delivery confirmation by a single call or separate calls.

It is the 13th object according to the present application to provide a user-friendly function with a low communication rate by preventing invalid line seizure if there is no response from the other party during communication concerning functional information, communication of the text, and communication concerning delivery confirmation performed by dial-up connection.

It is the 14th object according to the present application to provide a user-friendly function by permitting a user to selectively perform recall again after the line is once disconnected.

It is the 15th object according to the present application to realize communication using an image format as the maximum capability of the other party by forming destination functional information acquired in the past into a database, without requiring functional information of the destination apparatus whenever communication is performed.

It is the 16th object according to the present application to faithfully transmit image information intended by a user in an intended form by allowing the user to set whether image data is to be converted for each function such as resolution.

It is the 17th object according to the present application to permit a user to readily designate a function considering the maximum capability of the other party by displaying functional information corresponding to the address of the other party on the display of an operation panel.

It is the 18th object according to the present application to allow reliable communication with the other party by performing communication using a public network if a communication error occurs.

It is the 19th object according to the present application to manage functional information in an e-mail server connected by dial-up, thereby allowing a user who uses the Internet by connecting to a provider to communicate image data of e-mail data by the maximum capability of the other party.

It is the 20th object according to the present application to realize efficient processing by omitting, in the case of e-mail data communication, functional information pertaining to unnecessary communication from functional information defined by ITU-T T.30.

It is the 21st object according to the present application to transmit e-mail data, even when a communication error occurs, by converting the e-mail data into image data of a base line which the other party is most likely to be able to process, so that the e-mail data is reliably transmitted to the other party.

It is the 22nd object according to the present application to shorten the whole processing time by omitting the process of exchanging functional information when an image format designated by an operator at the transmitting end is functional information of a base line.

It is the 23rd object according to the present application to use identifiers for relating e-mail concerning functional information pertaining to the same process, e-mail of the text, and e-mail concerning delivery confirmation to each other, thereby managing the functional information for transmitting the same text and the e-mail for delivery confirmation by relating them to each other.

It is the 24th object according to the present application to provide delivery confirmation exchanging means in a communication apparatus capable of communication in the form of e-mail, thereby providing a communication apparatus capable of acknowledgement of communication results, equivalent to facsimile communication using a public network, while examining the features of a network used by a user.

It is the 25th object according to the present application to distinguish, in the case of communication of e-mail data, between communication of a base line not having a function of delivery confirmation information and information representing that the result of communication of image information is unverified, in accordance with the arrival status of delivery confirmation information.

It is the 26th object according to the present application to distinguish, in the case of communication of e-mail data, between communication of a base line not having a function of delivery confirmation information and result information of communication having a function of delivery confirmation.

It is the 27th object according to the present application to provide, in a communication apparatus capable of communication in the form of e-mail, a database of information pertaining to the other party and functional information by optimum means in accordance with the forms of connections to the Internet of apparatuses at both transmitting and receiving ends and with the installation state of an e-mail server, thereby realizing image data communication, equivalent to facsimile transmission using a public network, on e-mail communication and enabling rapid communication matching the capability of the other party by omitting the labor of exchanging functional information whenever communication is performed.

It is the 28th object according to the present application to perform communication pertaining to functional information with a registered destination apparatus, when a user registers or updates an e-mail address which he or she frequently uses, such as an e-mail address book function of storing one-touch buttons or abbreviated buttons, destination names, and destination e-mail addresses in one-to-one correspondence with each other, and stores the communication result in one-to-one correspondence with the registered e-mail address, thereby eliminating the labor of exchanging functional information whenever the text of e-mail is communicated and enabling rapid text communication matching the capability of the other party.

It is the 29th object according to the present application to set whether communication concerning functional information with the destination apparatus is to be performed in accordance with whether the connection to the Internet is dial-up connection or dedicated-line IP connection, thereby reducing the charge when a user connects by dial-up connection.

It is the 30th object according to the present application to register functional information of a base line if it is assumed that the other party is a system not having a function of exchanging functional information, thereby eliminating the labor of exchanging functional information whenever the text of e-mail is communicated and enabling rapid text communication matching the capability of the other party.

It is the 31st object according to the present application to share the contents of a functional information database with another apparatus, thereby eliminating the labor of exchanging functional information and enabling rapid text communication matching the capability of the other party.

It is the 32nd object according to the present application to always share the latest contents of a functional information database with another apparatus by transferring the database contents each time the database is updated or at any arbitrary timing, thereby eliminating the labor of exchanging functional information whenever communication is performed and enabling rapid text communication matching the capability of the other party.

It is the 33rd object according to the present application to collectively acquire functional information from an e-mail server for performing a distribution process, thereby enabling efficient acquisition of functional information, eliminating the labor of exchanging functional information, and enabling rapid text communication matching the capability of the other party.

It is the 34th object according to the present application to rapidly inform a user, in distributing e-mail by requesting an e-mail server to do so, of the transmission result by returning delivery confirmation when the e-mail data arrives at the distribution server, and allow the user to select the return of delivery confirmation when information is reliably distributed to the destination if the information is important, thereby adding a user-friendly function meeting the need of the user.

A communication apparatus of the present invention is an apparatus for transmitting/receiving e-mail data by connecting to the Internet, wherein when e-mail data having facsimile-format image data attached is to be communicated, communication concerning functional information is performed in addition to the communication of the e-mail data.

A communication apparatus of the present invention comprises first connecting means for connecting to a local area network and/or second connecting means for connecting to a wide area network, first communicating means for transmitting/receiving e-mail data by connecting to the Internet by one of the first and second connecting means, and second communicating means for performing facsimile communication by connecting to the wide area network by the second connecting means, wherein communication concerning functional information is performed when the first communicating means communicates e-mail data having image data attached.

According to one aspect of the communication apparatus of the present invention, if there is no response to the communication concerning functional information from a communication partner apparatus with which the first communicating means communicates, e-mail data is sent to the first communicating means by attaching image data corresponding to the most common one of image data standards.

According to another aspect of the communication apparatus of the present invention, if there is no response to the communication concerning functional information from a communication partner apparatus with which the first communicating means communicates and if communication by the second communicating means is designated and the number of the other party is designated, the second communicating means communicates image data.

According to still another aspect of the communication apparatus of the present invention, if during the communication by the first communicating means a communication error occurs in communication of image data and in communication pertaining to delivery confirmation, retransmission is performed by selecting the number of times of retransmission from a plurality of individually preset numbers of times of retransmission including 0, in accordance with the contents of the communication error.

According to still another aspect of the communication apparatus of the present invention, no retransmission is performed if the contents of the communication error indicate that there is no destination address.

According to still another aspect of the communication apparatus of the present invention, if a communication error occurs during the communication by the first communicating means, e-mail data describing information concerning communication error information is transmitted to the communication partner apparatus or to a previously designated e-mail address.

According to still another aspect of the communication apparatus of the present invention, if a communication error occurs during the communication by the first communicating means, e-mail data having image data attached is transmitted to the communication partner apparatus or a previously designated e-mail address.

According to still another aspect of the communication apparatus of the present invention, if a communication error occurs during the communication by the first communicating means, communication is performed in accordance with designation of whether transmission of e-mail by attaching image data by the most common one of image standards or retransmission is to be performed.

According to still another aspect of the communication apparatus of the present invention, the most common one of image standards is an MH coding system considered to be essential of functional information defined by ITU-T T.30, by which a resolution in a main scan direction is 8 pels/mm, a resolution in a sub-scan direction is 3.85 lines/mm, and an original width is 208 mm of A4 size.

According to still another aspect of the communication apparatus of the present invention, if the form of connection to the first communicating means is dial-up connection, communication concerning functional information, communication of a text, and communication concerning delivery confirmation are successively performed by a single call.

According to still another aspect of the communication apparatus of the present invention, if the form of connection to the first communicating means is dial-up connection, communication concerning functional information, communication of a text, and communication concerning delivery confirmation are separately performed by at least two calls.

According to still another aspect of the communication apparatus of the present invention, if the form of connection to the first communicating means is dial-up connection, communication concerning functional information, communication of a text, and communication concerning delivery confirmation are successively performed by a single call or separately performed by different calls.

According to still another aspect of the communication apparatus of the present invention, if the form of connection to the first communicating means is dial-up connection, a line is once disconnected to wait for timeout processing in communication.

According to still another aspect of the communication apparatus of the present invention, if the form of connection to the first communicating means is dial-up connection, a line is once disconnected to wait for timeout processing in communication, and timeout is selectively verified by recall.

According to still another aspect of the communication apparatus of the present invention, functional information of a destination apparatus is acquired by communication using one of the first and second communicating means in the past, a database for holding a maximum capability supported by each function is registered or updated, and, if the first communicating means is to communicate data, the data is converted into a standard registered in the database and communicated.

According to still another aspect of the communication apparatus of the present invention, whether image data pertaining to the database is to be converted is set for each function item registered in the database.

According to still another aspect of the communication apparatus of the present invention, if an address of the other party with respect to the first communicating means is input, display related to functional information on an operation panel is switched on the basis of information in the database.

According to still another aspect of the communication apparatus of the present invention, if a communication error occurs in the first communicating means, the second communicating means communicates image data if communication by the second communicating means is designated and a telephone number of the other party is set.

According to still another aspect of the communication apparatus of the present invention, the apparatus further comprises means for acquiring function identification information of a transmission destination by looking up a database stored in connection with functional information in an e-mail server connected by dial-up connection.

According to still another aspect of the communication apparatus of the present invention, when the first communicating means is to perform communication concerning the functional information, of pieces of functional information defined by ITU-T T.30, functional information pertaining to communication such as a handshake rate, a modem rate, a minimum transmission time, the presence/absence of error correction mode, and the presence/absence of G4 function need not be exchanged.

A communication apparatus of the present invention comprises first communicating means for transmitting/receiving e-mail data by connecting to the Internet, and means for sending e-mail by attaching image data by one of image standards which a communication partner is most likely to be able to process, if a communication error occurs when the first communicating means communicates e-mail data having image data attached.

A communication apparatus of the present invention comprises first communicating means for transmitting/receiving e-mail data by connecting to the Internet, means for designating an image format such as a resolution of image data, and means for requesting functional information, pertaining to the designated image format, of the other party, wherein functional information of the other party is not requested if the designated image format is an image format which the other party is most likely to be able to process.

A communication apparatus of the present invention comprises first communicating means for transmitting/receiving e-mail data by connecting to the Internet, and an identifier for relating pieces of e-mail concerning pieces of functional information pertaining to the same process to each other, when the first communicating means is to communicate e-mail data having image data attached.

A storage medium of the present invention is a computer-readable storage medium storing a program for causing a computer to execute a first communication procedure of transmitting/receiving e-mail data by connecting to the Internet and a second communication procedure of performing facsimile communication by connecting to a wide area network, and storing a program for causing a computer to execute communication concerning functional information if the first communication procedure is to communicate e-mail data having image data attached.

According to one aspect of the storage medium of the present invention, the storage medium stores a program for causing a computer to send e-mail data by attaching image data corresponding to the most common one of image data standards, if there is no response to the communication concerning functional information from a communication partner apparatus and performed by the first communication procedure.

According to another aspect of the storage medium of the present invention, the storage medium stores a program for causing a computer to communicate image data by the second communication procedure, if there is no response to the communication concerning functional information from a communication partner apparatus and performed by the first communication procedure and if communication by the second communication procedure and the number of the other party are designated.

According to still another aspect of the storage medium of the present invention, the storage medium stores a program for causing a computer to perform retransmission, if during the communication by the communication procedure a communication error occurs in communication of image data and in communication pertaining to delivery confirmation, by selecting the number of times of retransmission from a plurality of numbers of times of retransmission including 0, which are individually set in advance, in accordance with the contents of the communication error.

According to still another aspect of the storage medium of the present invention, the storage medium stores a program for causing a computer to perform no retransmission if the contents of the communication error indicate that there is no destination address.

According to still another aspect of the storage medium of the present invention, the storage medium stores a program for causing a computer to transmit, if a communication error occurs during the communication by the first communication procedure, e-mail data describing information concerning communication error information to the communication partner apparatus or to a previously designated e-mail address.

According to still another aspect of the storage medium of the present invention, the storage medium stores a program for causing a computer to transmit, if a communication error occurs during the communication by the first communication procedure, e-mail data having image data attached to the communication partner apparatus or to a previously designated e-mail address.

According to still another aspect of the storage medium of the present invention, the storage medium stores a program for causing a computer to perform communication, if a communication error occurs during the communication by the first communication procedure, in accordance with designation of whether transmission of e-mail by attaching image data by the most common one of image standards or retransmission is to be performed.

According to still another aspect of the storage medium of the present invention, the storage medium stores a program for causing a computer to perform communication such that the most common one of image standards is an MH coding system considered to be essential of functional information defined by ITU-T T.30, by which a resolution in a main scan direction is 8 pels/mm, a resolution in a sub-scan direction is 3.85 lines/mm, and an original width is 208 mm of A4 size.

According to still another aspect of the storage medium of the present invention, the storage medium stores a program for causing a computer to successively perform communication concerning functional information, communication of a text, and communication concerning delivery confirmation by a single call, if the form of connection by the first communication procedure is dial-up connection.

According to still another aspect of the storage medium of the present invention, the storage medium stores a program for causing a computer to separately perform communication concerning functional information, communication of a text, and communication concerning delivery confirmation by at least two calls, if the form of connection by the first communication procedure is dial-up connection.

According to still another aspect of the storage medium of the present invention, the storage medium stores a program for causing a computer to successively perform or separately perform communication concerning functional information, communication of a text, and communication concerning delivery confirmation by a single call or by different calls, if the form of connection by the first communication procedure is dial-up connection.

According to still another aspect of the storage medium of the present invention, the storage medium stores a program for causing a computer to once disconnect a line to wait for timeout processing in communication, if the form of connection by the first communication procedure is dial-up connection.

According to still another aspect of the storage medium of the present invention, the storage medium stores a program for causing a computer to once disconnect a line to wait for timeout processing in communication and selectively verify timeout by recall, if the form of connection by the first communication procedure is dial-up connection.

According to still another aspect of the storage medium of the present invention, the storage medium stores a program for causing a computer to acquire functional information of a destination apparatus by communication using one of the first and second communication procedures in the past, register or update a database for holding a maximum capability supported by each function, and, if communication is to be performed by the first communication procedure, convert an image standard designated by a user into a standard registered in the database on the basis of information of the database and communicate the image.

According to still another aspect of the storage medium of the present invention, the storage medium stores a program for causing a computer to set whether image data pertaining to the database is to be converted for each function item registered in the database.

According to still another aspect of the storage medium of the present invention, the storage medium stores a program for causing a computer to switch display related to functional information on an operation panel on the basis of information in the database, if an address of the other party is input in the first communication procedure.

According to still another aspect of the storage medium of the present invention, the storage medium stores a program for causing a computer to communicate image data by the second communication procedure, if a communication error occurs in the first communication procedure and if communication by the second communication procedure is designated and a telephone number of the other party is set.

According to still another aspect of the storage medium of the present invention, the storage medium having the communication function stores a program for causing a computer to execute a procedure of acquiring function identification information of a transmission destination by looking up a database stored in connection with functional information in an e-mail server connected by dial-up connection.

According to still another aspect of the storage medium of the present invention, the storage medium stores a program for causing a computer not to exchange, of pieces of functional information defined by ITU-T T.30, functional information pertaining to communication such as a handshake rate, a modem rate, a minimum transmission time, the presence/absence of error correction mode, and the presence/absence of G4 function, when communication concerning functional information of a storage medium having the communicating function is to be performed by the first communication procedure.

A storage medium of the present invention is a computer-readable storage medium storing a program for causing a computer to execute a first communication procedure of transmitting/receiving e-mail data by connecting to the Internet and a procedure of, if a communication error occurs while e-mail data having image data attached is communicated by the first communication procedure, sending e-mail by attaching the image data by one of image standards which the other party is most likely to be able to process.

A storage medium of the present invention is a computer-readable storage medium comprising a first communication procedure of transmitting/receiving e-mail data by connecting to the Internet, a procedure of designating an image format such as a resolution of image data, and a procedure of requesting functional information, pertaining to the designated image format, of the other party, and storing a program for causing a computer not to request functional information of the other party if the designated image format is an image format which the other party is most likely to be able to process.

A storage medium of the present invention is a computer-readable storage medium storing a program for causing a computer to execute a first communication procedure of transmitting/receiving e-mail data by connecting to the Internet and a procedure of, when e-mail data having image data attached is to be communicated by the first communication procedure, relating pieces of e-mail concerning pieces of functional information pertaining to the same process, e-mail of a text, and e-mail concerning delivery confirmation to each other.

According to still another aspect of the communication apparatus of the present invention, the wide area network is one of PSTN and ISDN.

A communication method of the present invention comprises the first communication step of transmitting/receiving e-mail data by connecting to the Internet, and the step of sending, if a communication error occurs while e-mail having image data attached is communicated in the first communication step, the e-mail by attaching the image data by one of image standards which the other party is most likely to be able to process.

A communication method of the present invention comprises the first communication step of transmitting/receiving e-mail data by connecting to the Internet, the step of designating an image format such as a resolution of image data, and the step of requesting functional information, pertaining to the designated image format, of the other party, wherein if the designated image format is an image format which the other party is most likely to be able to process, functional information of the other party is not requested.

A communication method of the present invention is a method of transmitting/receiving e-mail data by connecting to the Internet, wherein when e-mail data having facsimile-format image data attached is to be communicated, communication concerning functional information is performed in addition to the communication of the e-mail data.

A communication system of the present invention is a communication system for transmitting/receiving e-mail data by a plurality of communication apparatuses connected to the Internet, wherein when e-mail data having facsimile-format image data attached is to be communicated between the communication apparatuses, communication concerning functional information is performed in addition to the communication of the e-mail data.

A communication apparatus of the present invention comprises first connecting means for connecting to a local area network and/or second connecting means for connecting to a wide area network, first communicating means for transmitting/receiving e-mail data by connecting to the Internet by one of the first and second connecting means, and means for receiving information on delivery confirmation by the first communicating means, wherein when the first communicating means communicates e-mail data having image data attached, a communication result report is output which indicates one of information representing that communication of image information is successful, information representing that communication of image information has failed, information representing that a communication result of image information is unverified, and information representing that the e-mail data has been communicated by attaching image data corresponding to the most common one of image data standards.

According to one aspect of the communication apparatus of the present invention, the communication apparatus further comprises second communicating means for performing facsimile communication by connecting to the wide area network by the second connecting means.

According to another aspect of the communication apparatus of the present invention, when the second communicating means performs communication, two types of communication result reports indicating information representing that communication of image information is successful and information representing that communication of image information has failed are output.

A communication apparatus of the present invention comprises first communicating means for transmitting/receiving e-mail data by connecting to the Internet, and second communicating means for performing facsimile communication by connecting to a wide area network, wherein when the first communicating means communicates e-mail data having image data attached, a communication result report is output which indicates one of information representing that communication of image information is successful, information representing that communication of image information has failed, information representing that a communication result of image information is unverified, and information representing that the e-mail data has been communicated by attaching image data corresponding to the most common one of image data standards, and, when the second communicating means performs communication, a communication result report indicating one of information representing that communication of image information is successful and information representing that communication of image information has failed is output.

According to still another aspect of the communication apparatus of the present invention, the wide area network is one of PSTN and ISDN.

A communication method of the present invention is a method of transmitting/receiving e-mail data by connecting to the Internet, wherein when e-mail data having image data attached is communicated, a communication result report is output which indicates one of information representing that communication of image information is successful, information representing that communication of image information has failed, information representing that a communication result of image information is unverified, and information representing that the e-mail data has been communicated by attaching image data corresponding to the most common one of image data standards.

A communication system of the present invention is a communication system for transmitting/receiving e-mail data by a plurality of communication apparatuses connected to the Internet, wherein when e-mail data having image data attached is communicated, the communication apparatuses output a communication result report indicating one of information representing that communication of image information is successful, information representing that communication of image information has failed, information representing that a communication result of image information is unverified, and information representing that the e-mail data has been communicated by attaching image data corresponding to the most common one of image data standards.

A storage medium of the present invention is a computer-readable storage medium storing a program for causing a computer to execute a procedure of the communication method described above.

A communication apparatus of the present invention comprises first connecting means for connecting to a local area network and/or second connecting means for connecting to a wide area network, first communicating means for transmitting/receiving e-mail data by connecting to the Internet by one of the first and second connecting means, and a database for holding information pertaining to functional information, wherein the first communicating means communicates e-mail data having image data attached.

According to one aspect of the communication apparatus of the present invention, the communication apparatus further comprises second communicating means for performing facsimile communication by connecting to the wide area network by the second connecting means.

According to another aspect of the communication apparatus of the present invention, the communication apparatus has an e-mail address registration function of registering an address of a communication partner and, when an e-mail address using the first communicating means is registered in the e-mail address registration function, communication concerning functional information is performed with respect to a destination apparatus registered in the e-mail address registration function, and the functional information is registered or updated with respect to an item, corresponding to the registered e-mail address, in the database.

According to still another aspect of the communication apparatus of the present invention, in accordance with whether the form of connection to the first communicating means is dial-up connection via the wide area network or dedicated-line IP connection, whether communication concerning functional information with respect to a communication partner apparatus registered in the e-mail address registration function is to be performed is individually set during registration of the e-mail address registration function.

According to still another aspect of the communication apparatus of the present invention, in accordance with whether the form of connection to the first communicating means is dial-up connection via the wide area network or dedicated-line IP connection, communication concerning functional information is performed with respect to a communication partner apparatus registered in the e-mail address registration function and, if no functional information of the communication partner apparatus is acquired, functional information corresponding to the most common one of image data standards is registered, during registration of the e-mail address registration function.

According to still another aspect of the communication apparatus of the present invention, the communication apparatus further comprises means for transmitting the contents of the database to a communication partner apparatus, the means notifying the communication partner apparatus of information registered in the database each time the database is updated or at any arbitrary timing.

According to still another aspect of the communication apparatus of the present invention, the communication apparatus further comprises means for transmitting the contents of the database to an e-mail server for distributing e-mail data to a connected communication partner apparatus, the means notifying the e-mail server of information registered in the database each time the database is updated or at any arbitrary timing.

A communication system of the present invention comprises a plurality of communication apparatuses each of which comprises first connecting means for connecting to a local area network and/or second connecting means for connecting to a wide area network, first communicating means for transmitting/receiving e-mail data by connecting to the Internet by one of the first and second connecting means, and a database for holding information concerning functional information, and which communicates e-mail data having image data attached by the first communicating means, wherein on the basis of information about broadcast of a database pertaining to the functional information from an e-mail server to which the plurality of communication apparatuses are connected and which distributes e-mail data to the plurality of communication apparatuses, the database of each communication apparatus is updated to allow the plurality of communication apparatuses to share the contents of the databases.

According to one aspect of the communication system of the present invention, the communication system further comprises second communicating means for performing facsimile communication by connecting to the wide area network by the second connecting means.

According to another aspect of the communication system of the present invention, when the e-mail server distributes e-mail data having facsimile image data attached to the communication apparatus connected, delivery confirmation is returned to the communication apparatus connected, without distributing the e-mail data having facsimile information attached to the communication apparatus or after the e-mail data is distributed to the communication apparatus, after the e-mail server completes data reception.

A communication apparatus of the present invention comprises first communicating means for transmitting/receiving e-mail data by connecting to the Internet, means for designating an image format such as a resolution of image data, and means for requesting functional information, pertaining to the designated image format, of a communication partner, wherein if functional information of the communication partner is known, the functional information of the communication partner is not requested.

A communication apparatus of the present invention comprises first communicating means for transmitting/receiving e-mail data by connecting to the Internet, second communicating means for performing facsimile communication by connecting to a wide area network, and a database for holding information concerning functional information, wherein the first communicating means communicates e-mail data having image data attached.

A storage medium of the present invention is a computer-readable storage medium storing a program for causing a computer to execute a first communication procedure of transmitting/receiving e-mail data by connecting to the Internet and a second communication procedure of performing facsimile communication by connecting to a wide area network, and storing a program for causing a computer to search a database for information concerning functional information and communicate e-mail data having image data attached by the first communication procedure.

According to one aspect of the storage medium of the present invention, the storage medium stores a program for causing a computer to execute an e-mail address registration function for registering an address, and a program for causing a computer to perform communication pertaining to functional information, when an e-mail address is registered in the e-mail address registration function, with a communication partner apparatus registered in the e-mail address registration function, and register or update the functional information with respect to an item, corresponding to the registered e-mail address, in the database.

According to another aspect of the storage medium of the present invention, the storage medium stores a program for causing a computer to individually set, in accordance with whether the form of connection to the Internet is dial-up connection via a wide area network or dedicated-line IP connection, whether communication concerning functional information with respect to a communication partner apparatus registered in the e-mail address registration function is to be performed, during registration of the e-mail address registration function.

According to still another aspect of the storage medium of the present invention, the storage medium stores a program for causing a computer to perform communication concerning functional information, in accordance with whether the form of connection to the Internet is dial-up connection via a wide area network or dedicated-line IP connection, with a communication partner apparatus registered in the e-mail address registration function and, if no functional information of the communication partner apparatus is acquired, register functional information corresponding to the most common one of image data standards, during registration of the e-mail address registration function.

According to still another aspect of the storage medium of the present invention, the storage medium stores a program for causing a computer to execute a procedure of transferring the contents of the database to a communication partner apparatus, and a program for causing a computer to notify another communication partner apparatus of information registered in the database each time the database is updated or at any arbitrary timing.

According to still another aspect of the storage medium of the present invention, the storage medium stores a program for causing a computer to execute a procedure of transferring the contents of the database to an e-mail server for distributing e-mail data addressed to a communication partner apparatus connected, and a program for causing a computer to notify the e-mail server of information registered in the database each time a database of the communication partner apparatus is updated or at any arbitrary timing.

A communication system of the present invention comprises a communication apparatus which comprises first communicating means for transmitting/receiving e-mail data by connecting to the Internet, second communicating means for performing facsimile communication by connecting to a wide area network, and a database for holding information concerning functional information, and which communicates e-mail data having image data attached by the first communicating means, wherein on the basis of information about broadcast of a database pertaining to the functional information from an e-mail server to which a plurality of the communication apparatuses are connected and which distributes e-mail data to the plurality of communication apparatuses, the database of each communication apparatus is updated to allow the plurality of communication apparatuses to share the contents of the databases.

According to one aspect of the communication system of the present invention, when the e-mail server distributes e-mail data having facsimile image data attached to the communication apparatus connected, delivery confirmation is returned to the communication apparatus connected, without distributing the e-mail data having facsimile information attached to the communication apparatus or after the e-mail data is distributed to the communication apparatus, after the e-mail server completes data reception.

A storage medium of the present invention is a computer-readable storage medium storing a program for causing a computer to execute a first communication procedure of transmitting/receiving e-mail data by connecting to the Internet, a procedure of designating an image format such as a resolution of image data, and a procedure of requesting functional information, pertaining to the designated image format, of the other party, and a program for causing a computer not to request functional information of the other party if the functional information of the other party is known.

According to still another aspect of the communication apparatus of the present invention, the wide area network is one of PSTN and ISDN.

According to still another aspect of the communication system of the present invention, the wide area network is one of PSTN and ISDN.

A communication method of the present invention is a method of transmitting/receiving e-mail data by connecting to the Internet, comprising the steps of designating an image format such as a resolution of image data, requesting functional information, pertaining to the designated image format, of a communication partner apparatus, and if functional information of the communication partner is known, not requesting the functional information of the communication partner.

A communication method of the present invention is a method of transmitting/receiving e-mail data by connecting to the Internet, comprising the steps of performing communication pertaining to functional information, when a mail address is registered in an e-mail address registration function, with a communication partner apparatus registered in the e-mail address registration function, and registering or updating the functional information with respect to an item, corresponding to the registered e-mail address, in a database.

According to one aspect of the communication method of the present invention, in accordance with whether the form of connection to the Internet is dial-up connection via a wide area network or dedicated-line IP connection, whether communication concerning functional information with respect to a communication partner apparatus registered in the e-mail address registration function is to be performed is individually set during registration of the e-mail address registration function.

According to another aspect of the communication method of the present invention, in accordance with whether the form of connection to the Internet is dial-up connection via a wide area network or dedicated-line IP connection, communication concerning functional information is performed with respect to a communication partner apparatus registered in the e-mail address registration function and, if no functional information of the communication partner apparatus is acquired, functional information corresponding to the most common one of image data standards is registered, during registration of the e-mail address registration function.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a schematic view showing one example of a communication management report by a G3 apparatus; and FIG. 13 is a schematic view showing one example of a communication management report by an e-mail•facsimile apparatus.

DETAILED DESCRIPTION OF THE PREFERRED EMBODIMENT

A preferred embodiment of the present invention will be described in detail below with reference to the accompanying drawings.

Figure 1:
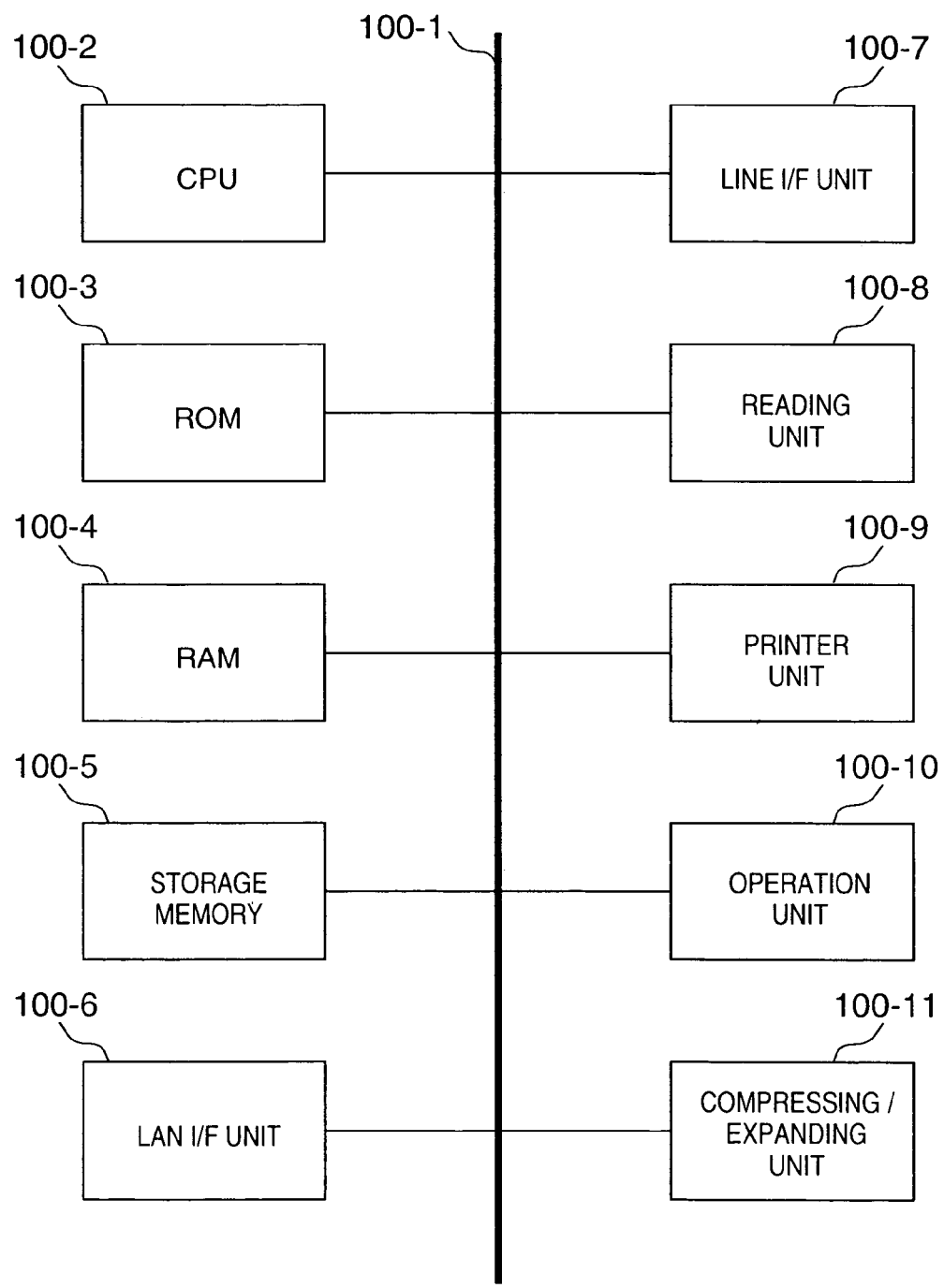
FIG. 1 is a block diagram showing the system configuration of an e-mail•facsimile exchanging apparatus.

FIG. 1 is a block diagram showing the system configuration of an e-mail•facsimile exchanging apparatus of this embodiment.

Referring to FIG. 1, a bus 100-1 comprises address and data buses to which individual blocks to be described later are connected. This bus 100-1 transfers information between these blocks. A CPU 100-2 executes a computer program (software for controlling the whole apparatus) stored in a ROM 100-3 to control the e-mail•facsimile exchanging apparatus.

The ROM 100-3 is a read-only memory storing the computer program to be executed by the CPU 100-2 and data such as fonts. A RAM 100-4 is a random memory for storing various data necessary for control, the states of software switches, and management data. A storage memory 100-5 is a file memory for storing coded image data and e-mail data.

A line I/F unit 100-7 includes, e.g., a CCU (Communication Control Unit), modem, and NCU (Network Control Unit) for performing communication by connecting to an ISDN or PSTN. This line I/F unit 100-7 connects the line and communicates data under the control of the CPU 100-2. A reading unit 100-8 is an image reader which scans an original and reads information of the original as image data. A printer unit 100-9 prints image data read via the reading unit 100-8, a LAN I/F unit 100-6, and the line I/F unit 100-7, or image data such as a report of management information formed by the CPU 100-2.

An operation unit 100-10 is a block functioning as a man-machine I/F of the e-mail•facsimile exchanging apparatus of this embodiment. This operation unit 100-10 has a display unit and various keys (not shown) and loads information input by a key and transfers various kinds of display information to be displayed on the display unit under the control of the CPU 100-2. A compressing/expanding unit 100-11 performs encoding and decoding, e.g., compresses image data read by the reading unit 100-8 by encoding the data by any of various coding systems such as MH, MR, MMR, and JBIG, decodes encoded image data received by the line I/F unit 100-7 or the LAN I/F unit 100-6, and converts codes of an image file on the storage memory 100-5 into codes required for communication.

The LAN I/F unit 100-6 is an interface for connecting to a LAN (Local Area Network) and has an interface such as Ethernet or FDDI. Via this interface the LAN I/F unit 100-6 connects this e-mail•facsimile exchanging apparatus to the local area network.

Note that the ROM 100-3 stores bitmap data of fonts for converting character codes into bitmap image data when a text portion of e-mail data or a text portion of a communication management report is to be converted into bitmap image data.

In this embodiment, the system configuration based on the existing facsimile apparatus is shown. However, a system can also be constructed by, e.g., a scanner, a printer, a display, a keyboard, and a modem on the basis of a personal computer main body having a LAN interface or modem interface. When this is the case, a program for a communication function of the present application is supplied by an external storage medium such as a floppy disk.

Examples of the connection of the e-mail•facsimile exchanging apparatus of this embodiment to the Internet will be described below with reference to FIGS. 2, 3, and 4. The e-mail•facsimile exchanging apparatus of this embodiment has a plurality of forms of connections to the Internet, i.e., a dedicated-line IP connection and a dial-up connection, and communicates e-mail to another e-mail•facsimile exchanging apparatus or to a post office of an e-mail server by the most optimum method in accordance with each form. Also, in accordance with an instruction the e-mail•facsimile exchanging apparatus relays received image data to another G3 or G4 facsimile apparatus.

Figure 2:
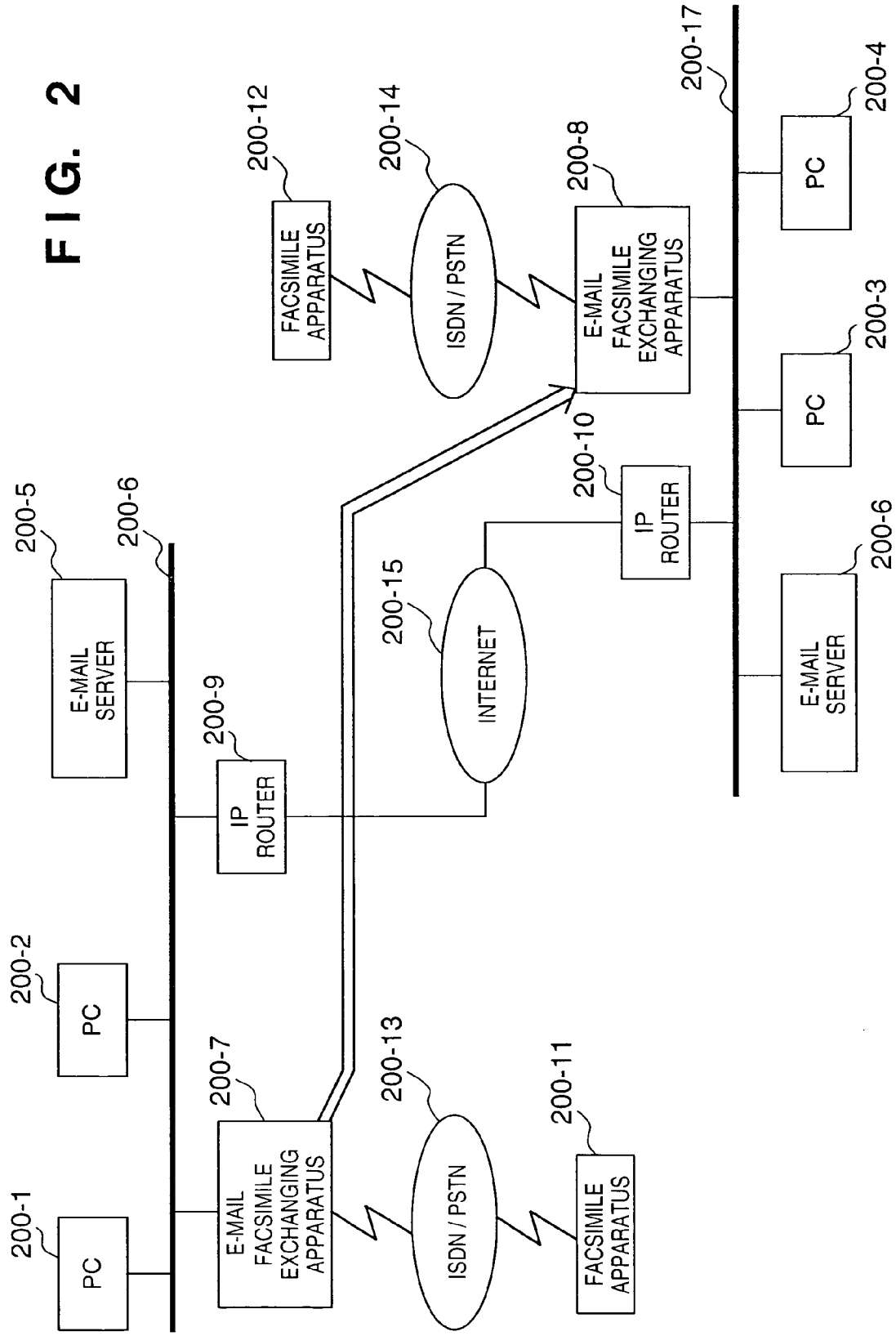
FIG. 2 is a schematic view showing an example of the connection of the e-mail•facsimile exchanging apparatus to the Internet.
Figure 3:
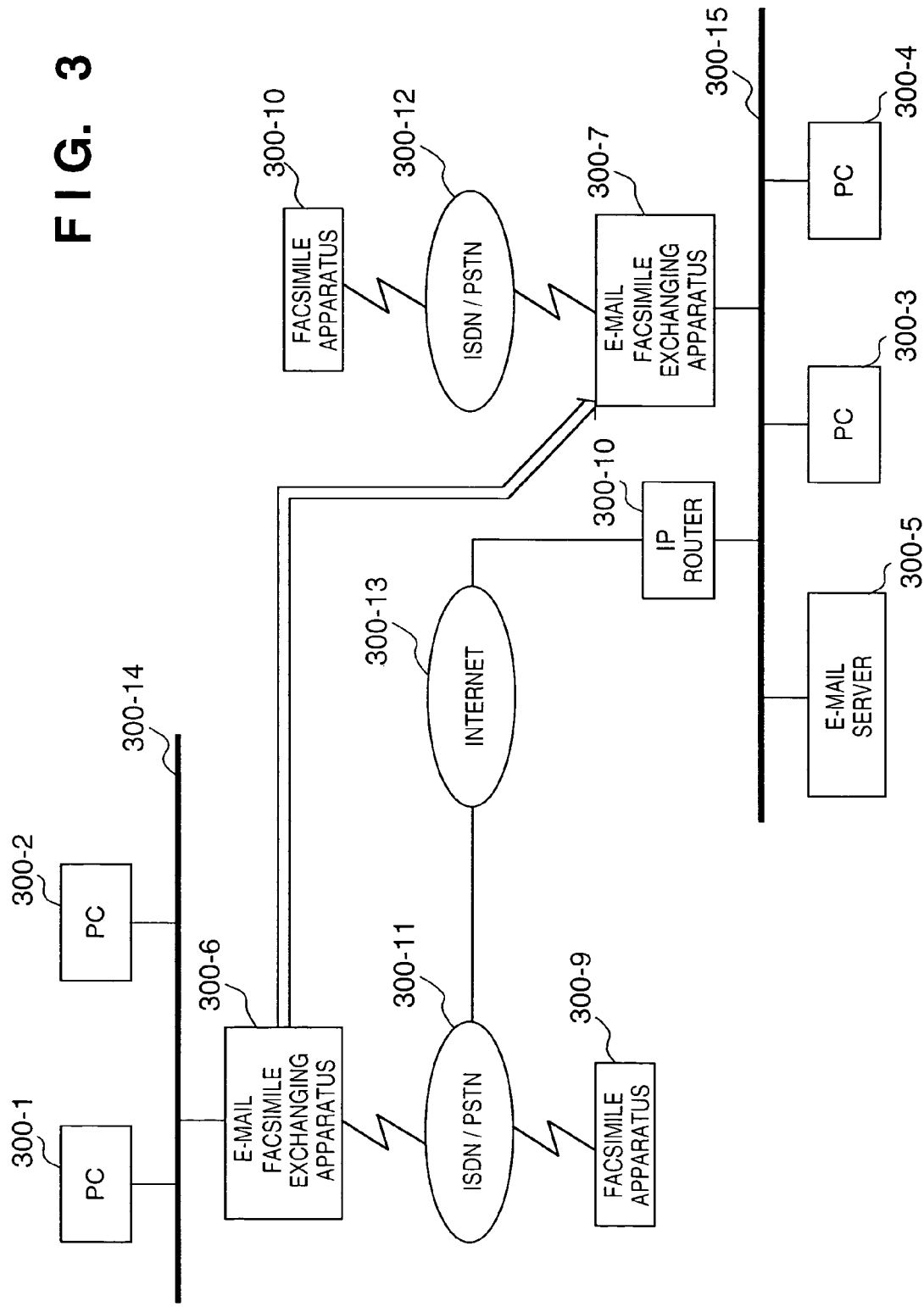
FIG. 3 is a schematic view showing another example of the connection of the e-mail•facsimile exchanging apparatus to the Internet.
Figure 4:
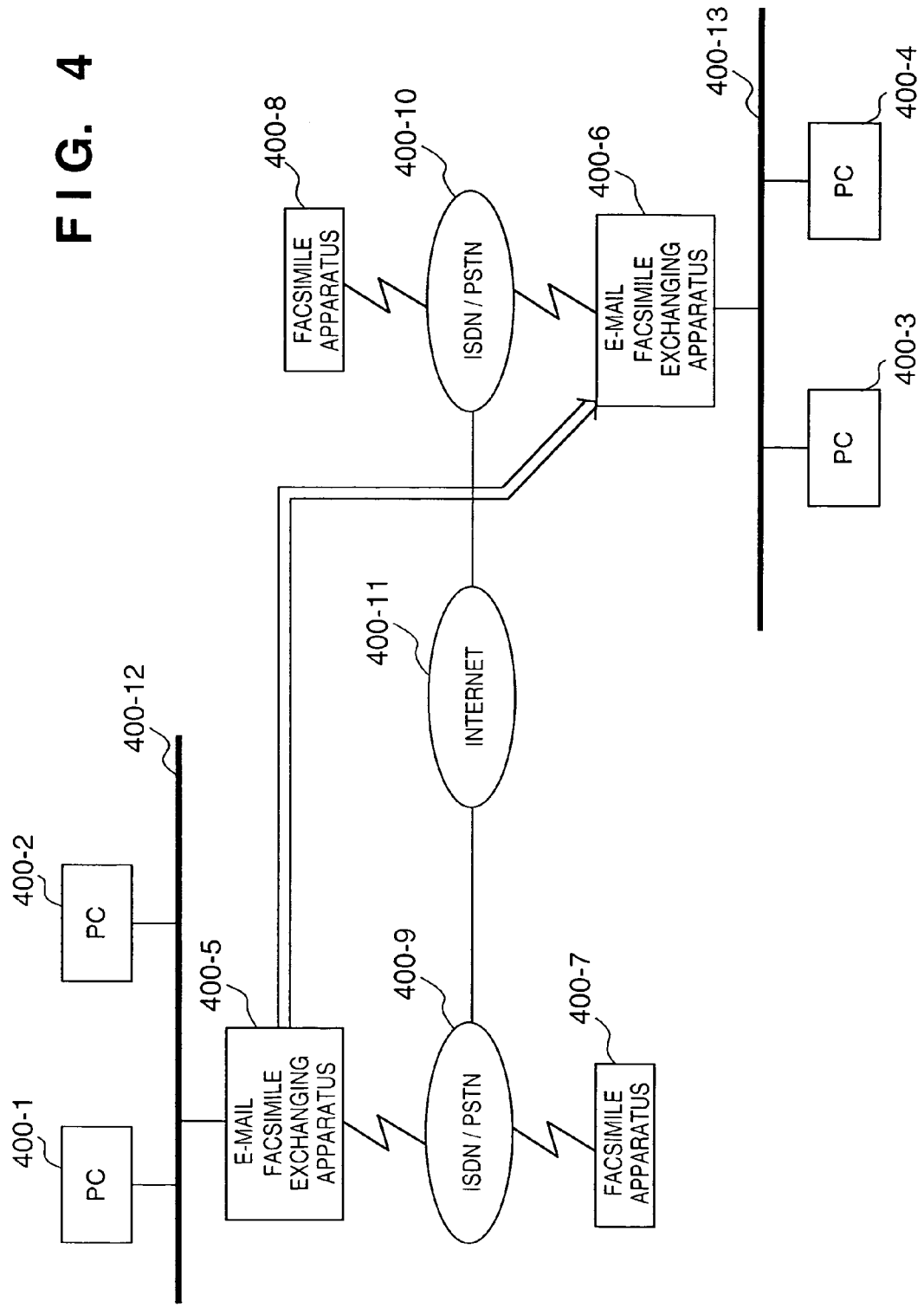
FIG. 4 is a schematic view showing still another example of the connection of the e-mail•facsimile exchanging apparatus to the Internet.

Usually, forms of connection between a LAN and the Internet are: a dedicated-line IP connection, as shown in FIG. 2, by which a LAN and the Internet always perform two-way communication via a dedicated line by using an IP router; and a dial-up connection, as shown in FIG. 4, by which a LAN and the Internet are connected by dial-up via a PSTN or ISDN as a public (wide-area) network (note that in FIGS. 3 and 4, the e-mail•facsimile exchanging apparatus has a function of an ISDN router and connects a LAN to the Internet by dial-up).

Accordingly, the combinations of connections of the e-mail•facsimile exchanging apparatus of this embodiment and the Internet are: as shown in FIG. 2, the e-mail•facsimile exchanging apparatuses at both the transmitting and receiving ends are connected by dedicated-line IP connection via LANs; as shown in FIG. 3, one is connected by dedicated-line IP connection via a LAN, and the other is connected by dial-up connection via an ISDN/PSTN; and as shown in FIG. 4, both the transmitting and receiving ends are connected by dial-up connection via an ISDN/PSTN.

Note that in the dial-up connection, an e-mail POP3 (Post Office Protocol Ver. 3) server to which each e-mail•facsimile exchanging apparatus and e-mail software of a PC (Personal Computer) connects is provided by an Internet provider (not shown) in the Internets 200-15, 300-13, or 400-11. Therefore, it should be noted that in this dial-up connection the e-mail server and the e-mail•facsimile exchanging apparatus do not always exchange information.

Referring to FIG. 2, PCs 200-1 and 200-2 are personal computers connected to a LAN 200-16 and exchange information via this LAN 200-16 with other PCs, an e-mail server 200-5, an e-mail•facsimile exchanging apparatus 200-7, and an IP router 200-9. Likewise, PCs 200-3 and 200-4 are personal computers connected to a LAN 200-17 and exchange information via this LAN 200-17 with other PCs, an e-mail server 200-6, an e-mail•facsimile exchanging apparatus 200-8, and an IP router 200-10.

The e-mail server 200-5 has the function of SMTP (Simple Mail Transfer Protocol)/POP3 and stores e-mail addressed to each client in the LAN 200-6 into a corresponding post address that is set in the e-mail server 200-5.

In FIGS. 2 and 3, the e-mail servers and the e-mail•facsimile exchanging apparatuses are separated. However, each e-mail•facsimile exchanging apparatus can naturally have the function of the e-mail server.

Similarly, the e-mail server 200-6 has the function of SMTP/POP3 and stores e-mail addressed to each client in the LAN 200-17 into a corresponding post address that is set in the e-mail server 200-6.

The IP router 200-9 connects the LAN 200-16 to the Internet 200-15 and performs routing of an IP packet transmitted from a domain in the LAN 200-16 to the Internet 200-15 and an IP packet transmitted from the Internet 200-15 to a domain in the LAN 200-16. Likewise, the IP router 200-10 connects the LAN 200-17 to the Internet 200-15 and performs routing of an IP packet transmitted from a domain in the LAN 200-17 to the Internet 200-15 and an IP packet transmitted from the Internet 200-15 to a domain in the LAN 200-17.

The e-mail•facsimile exchanging apparatus 200-7 is a communication apparatus as the characteristic feature of this embodiment and performs, by using the line I/F unit 100-7, facsimile communication using the G3/G4 protocol with other facsimile apparatuses 200-11 and 200-12 connected to the ISDN/PSTN line. Also, this e-mail•facsimile exchanging apparatus 200-7 performs e-mail communication with the Internet 200-15 via the LAN 200-16 and the IP router 200-9 by using the LAN I/F unit 100-6. Analogously, the e-mail•facsimile exchanging apparatus 200-8 is a communication apparatus as the characteristic feature of this embodiment and performs, by using the line I/F unit 100-7, facsimile communication using the G3/G4 protocol with the other facsimile apparatuses 200-11 and 200-12 connected to the ISDN/PSTN line. This e-mail•facsimile exchanging apparatus 200-8 also performs e-mail communication with the Internet 200-15 via the LAN 200-17 and the IP router 200-10 by using the LAN I/F unit 100-6.

The ISDN/PSTN 200-13 or 200-14 is a public network (ISDN or PSTN) for performing facsimile communication and telephone communication. Although the ISDN/PSTN 200-13 and the ISDN/PSTN 200-14 are separately depicted in FIG. 2, they can also be a single public network. The facsimile apparatuses 200-11 and 200-12 are connected to the public network (ISDN or PSTN) and communicate image data by the G3 or G4 protocol.

FIG. 3 is the same arrangement as in FIG. 2 except the connection between a LAN 300-14 and the Internet 300-13. Referring to FIG. 3, the LAN 300-14 is connected to an Internet provider (not shown) in the Internet 300-13, instead of being connected via an IP router as explained in FIG. 2, by dial-up connection performed by the line I/F unit 100-7 in an e-mail•facsimile exchanging apparatus 300-6 via an ISDN/PSTN 300-11.

To communicate e-mail, therefore, the e-mail•facsimile exchanging apparatus 300-6 connects by dial-up to an e-mail server (not shown) installed by the Internet provider in the Internet 300-13 and communicates the e-mail via this e-mail server.

Also, the line I/F unit 100-7 of the e-mail•facsimile exchanging apparatus 300-6 performs facsimile communication with a facsimile apparatus 300-9 via the ISDN/PSTN 300-11, in addition to connecting to the Internet.

Referring to FIG. 4, both LANs 400-12 and 400-13 are connected to the Internet via a public network (ISDN/PSTN).

Accordingly, when an E-Mail-Facsimile Exchanging apparatus 400-5 is to communicate e-mail, the line I/F unit 100-7 connects by dial-up with an e-mail server (not shown) installed by an Internet provider in the Internet 400-11 via an ISDN/PSTN 400-9 and communicates the e-mail. Similarly, when an e-mail•facsimile exchanging apparatus 400-6 is to communicate e-mail, the line I/F unit 100-7 connects by dial-up with an e-mail server (not shown) installed by another Internet provider in the Internet 400-11 via an ISDN/PSTN 400-10 and communicates the e-mail.

A flow when e-mail having image data attached is communicated between e-mail•facsimile exchanging apparatuses will be described in detail below. First, functional information will be described. G3 facsimile functional information is defined by DIS/DTC/DCS bits in ITU-T T.30 and includes information concerning image data formats, information concerning facsimile services, and information about communication. Note that a sub-address, a password, and selective polling used in some facsimile service use information in an FIF (Facsimile Information Field) as 20 digits designated by another FCF (Facsimile Control Field).

Table 1 shows the DIS/DTC/DCS functional information in ITU-T T.30 plus a few pieces of additional functional information by taking account of the case in which image data other than a facsimile image is attached in e-mail communication. In Table 1, the functional information pertaining to ITU-T T.30 is further divided into information concerning "image" that can be handled, "service", and "communication".

TABLE 1

| | | | |
|---|---|---|---|
| Image | Coding system | | MH, MR, MMR, JBIG, non-compression mode |
| | Resolution | Main scan | 8 pels/mm, 16 pels/mm 200 dpi, 300 dpi, 400 dpi, 600 dpi |
| | | Sub-scan | 3.85 lines/mm, 7.7 lines/mm, 15.4 lines/mm 200 dpi, 300 dpi, 400 dpi, 600 dpi |
| | Recording width | | 215 mm, 255 mm, 303 mm |
| | Original Length | | No limit, A4(297 mm), B4(364 mm) |
| Service | Sub-address | | 20-DIGIT FIF (Confidential, Relay, Timer) in addition to presence/absence |
| | Password | | 20-DIGIT FIF in addition to presence/absence |
| | Selective polling | | 20-DIGIT FIF in addition to presence/absence |
| | File transfer | | EDI, DTM, BTM, BFT |
| Communication | Handshake | | 1200 bits/s, 2400 bits/s |
| | Transfer rate | | V.27ter    4800 bits/s 2400 bits/s |
| | | | V.29    9600 bits/s 7200 bits/s |
| | | | V.33    14,400 bits/s 12,000 bits/s |
| | | | V.17    14,400 bits/s 12,000 bits/s 9600 bits/s 7200 bits/s |
| | | | V.34    33,600 to 2400 bits/s |
| | | | V.34    (functional information is exchanged by not by T.30) |
| | Minimum transmission time | | 40 ms, 20 ms, 5 ms, 0 ms |
| | Error correction mode | | Presence/absence |
| | G4 | | Presence/absence |
| Email addition | Number of times of retransmission | | |
| | Memory capacity | | Block size of image data |
| | Application | | Type•version of registered application |
| | Language environment | | Japanese, English, French, Spanish, Portuguese, etc. |
| | Printer | Printer language | Printer language and version |
| | | Resolu- | 180 dpi, 360 dpi, 720 |

TABLE 1-continued

| | |
|---|---|
| tion | dpi, 300 dpi, 400 dpi, 600 dpi, 1200 dpi |
| Color · B/W | Depth (1.8, 16, 24,. 32, 48) |
| Color space | RGB, YUV, CMYK |
| Sheet size | LTR, LEGAL, A3, A4, A5, B4, B5 |
| Sheet direction | LANDSCAPE, PORTRAIT |
| Printing on both sides | Presence/absence |
| Sorter | Presence/absence and function |
| Finisher | Presence/absence and function |

In the e-mail•facsimile exchanging apparatus of this embodiment, functional information concerning 1) G3/G4 communication and functional information concerning 2) image and service are separately processed. The pieces of functional information pertaining to 2) image and service are switched by changing software switches set in the RAM 100-4 of the apparatus and hence are substantially fixed to the apparatus (the recording width and the like are frequently changed in accordance with loaded paper sheets in some e-mail•facsimile exchanging apparatuses, but this is not true if a sheet size changing function is included).

Accordingly, when functional information is registered as a database in an e-mail•facsimile exchanging apparatus or e-mail server (including a dial-up connection destination) at the transmitting end and image data is communicated on the basis of this database, it is unnecessary to exchange functional information in communication to an apparatus having the database. This is a particularly effective means when the e-mail•facsimile exchanging apparatuses are connected by dial-up and so the communication cost increases if functional information is exchanged whenever communication is performed, or when a facsimile network is formed in a company or the like by using a relay function and a broadcast function. The pieces of functional information pertaining to 1) G3/G4 communication are not particularly necessary in e-mail communication. Therefore, these pieces of functional information need not be exchanged in e-mail communication.

When the e-mail•facsimile exchanging apparatus transfers image data received by another G3/G4 facsimile apparatus by relay, functional information concerning the communication is exchanged between the e-mail•facsimile exchanging apparatus for relay and the G3 or G4 apparatus as a communication partner. Hence, exchange of the functional information concerning G3/G4 communication is unnecessary especially in e-mail communication.

Means for exchanging functional information and delivery confirmation information will be described below. A plurality of means are currently usable to exchange functional information as described below. The first means is a method of defining an information field pertaining to functional information and delivery confirmation as MIME type in e-mail, setting the pieces of functional information shown in Table 1 and the information concerning delivery confirmation in this field, and communicating the e-mail. The second means is a method of defining a functional information field and a delivery confirmation field in image data attached as a TIFF file, setting the pieces of functional information shown in Table 1 and information about delivery confirmation in these fields, and communicating e-mail by attaching the functional information as a TIFF file.

In these methods, e-mail pertaining to the same process is sometimes communicated as it is divided into e-mail concerning exchange of functional information, e-mail concerning information of image data, and e-mail relating to delivery confirmation. Therefore, a specific ID is given to indicate that these pieces of e-mail are related to the same process, and the pieces of e-mail are identified as being related to the same process by this ID.

Still another means is to perform communication concerning exchange of functional information and delivery confirmation by using the ESMTP as an extended protocol of the SMTP (Simple Mail Transfer Protocol). When this is the case, delivery confirmation is realized using the DSN (Delivery Status Notification) defined by the ESMTP. Note that the e-mail•facsimile exchanging apparatus of this embodiment can use any of these means for functional information exchange and delivery confirmation.

The flow of communication of e-mail having a facsimile image attached will be described in detail below with reference to flow charts in FIGS. 5, 6, 7, and 8. These flow charts can be used regardless of whether the connection form is dedicated-line IP connection or dial-up connection.

First, in step S100-1, communication of e-mail having image data attached is designated by a key operation from the operation unit 100-1 or by timer activation by the CPU 100-2. In step S100-2, whether functional information corresponding to the designated e-mail address is registered in the database is checked. This database search can be performed for the database that is set in the RAM 100-4 of the e-mail•facsimile exchanging apparatus of this embodiment or for the database on the e-mail server separately set as shown in FIG. 2.

If the functional information corresponding to the address of the transmission destination is already registered in the database, the flow advances to step S100-3; if not, the flow advances to step S100-6. In step S100-3, the display contents of the operation unit 100-10 are changed on the basis of the looked-up database. If the image data is already stored, the change of the display of the operation unit 100-10 in step S100-3 is skipped. In step S100-4, whether the functional information designated by the user or the formation of the stored image data is different from the information of the looked-up database is checked. If YES in step S100-4, the flow advances to step S100-5, and the format of the image data is converted into any image format registered in the database.

Note that whether the process of collating the database in step S100-4 is to be performed can be designated for each functional item. This is to give the database flexibility by skipping collation of functional information not used depending on the mode.

If skip of functional information communication is designated in step S100-6, the process concerning functional information communication is skipped, and the flow branches to step S100-25.

Skip of functional information is designated when a database of functional information is already included, such as when communication is performed by relay or broadcast, or even if there is no such database, when exchange of functional information is unnecessary, such as when functional information used in communication is the most common one (e.g., a standard resolution or A4 size) of image data standards as a base line.

When the functional information communication is not to be skipped, the flow advances to step S100-7 to start communicating the functional information. In step S100-8, an error in communication of this functional information is monitored. If an error occurs, the flow branches to step S100-14. Also, in step S100-9 a response to the functional information communication is monitored by a timer (not shown). If timeout occurs, the flow similarly branches to step S100-14.

This timeout time can be individually set for each transmission destination address or domain. This is to handle a plurality of connection forms in which, e.g., as shown in FIGS. 2, 3, and 4, the transmission destination is connected to an e-mail server by dial-up connection or by a dedicated line, and the transmission source is connected to an e-mail server by dial-up connection or by a dedicated line. Especially in dial-up connection, a response to functional information extremely delays in some cases.

When communication of the functional information is normally done, the flow advances to step S100-10 to newly register or update, where necessary, the database concerning functional information of the other party. If the e-mail•facsimile exchanging apparatus has no e-mail server function as shown in FIG. 2, the updated contents of this functional information database are communicated to a separately installed e-mail server.

If the e-mail•facsimile exchanging apparatus is connected to the Internet by dial-up connection as shown in FIGS. 3 and 4, data concerning the update of the internal database of the e-mail server need not be retransmitted from the e-mail•facsimile apparatus. If this is the case, the e-mail server can acquire functional information communication data addressed to the e-mail•facsimile exchanging apparatus and automatically update the database of this e-mail server.

Error processing from step S100-14 will be described below. If a communication error occurs in step S100-8 or if a timeout error occurs in step S100-9, the flow advances to step S100-14. If in step S100-14 transfer communication of image data corresponding to the occurrence of an error is designated by G3/G4 transmission in accordance with settings of software switches in the RAM 100-4, the flow advances to step S100-15 to communicate the image data stored in the storage memory 100-5 by G3/G4 communication by using the line I/F 100-7.

The telephone number used in this G3/G4 communication can be either the number of the e-mail•facsimile exchanging apparatus of this embodiment or the number of a G3/G3 dedicated machine in the same office. Also, this telephone number is set independently of the e-mail address. Note that as the method of designating G3/G4 transfer communication, it is possible to use 1) a method of registering the telephone number and transfer designation in addition to the e-mail address in a one-touch dial or in an abbreviated dial, or 2) a method by which when a user inputs the e-mail address and subsequently inputs the telephone number and instructs the start of communication by key operation, G3/G4 transfer communication designation is set.

Alternatively, when a user inputs the telephone number and then inputs the e-mail address and instructs the start communication by key operation, transmission of image data by G3/G4 communication is attempted. If this G3/G4 communication fails, communication by e-mail is performed in error processing.

If in step S100-16 base line designation upon occurrence of an error is performed by designating base line conversion, the flow advances to step S100-17 to convert the stored image data into image data of the base line format. This is to deal with a case in which the communication partner is not an e-mail•facsimile exchanging apparatus having functional information exchanging means but an e-mail user using a personal computer or an e-mail•facsimile exchanging apparatus having no functional information exchanging function.

If it is previously known that the transmission destination is an apparatus having no functional information, base-line functional information is set in the database so that image data is restricted to the base line. Also, in step S100-6 skip of functional information communication is designated, and in step S100-39 to be described later skip of delivery confirmation is designated. Consequently, image data can be communicated without performing communication for exchange of functional information and exchange of delivery confirmation with respect to an apparatus having no functions of functional information exchange and delivery confirmation.

Note that the formation of the database for a base line is designated by key operation of a base-line key or the like, or the database is automatically formed in accordance with the contents of a communication error and timeout error in functional information exchange up to the point.

In step S100-18, whether it is set that information concerning the error is transmitted as text information to a specific e-mail address is checked. If YES in step S100-18, the flow advances to step S100-19 to transmit e-mail pertaining to the error information. Note that as the e-mail address herein set, the e-mail address of a user who has operated the communication, the e-mail address of the manager, or the e-mail address of the transmission destination is designated. Note also that this error information contains, e.g., the presence/absence of communication by the base line and the presence/absence of G3/G4 communication.

The designation of error information communication can be individually set for each error item and for each item such as the presence/absence of base-line communication and the presence/absence of G3/G4 communication. If necessary, error image data can be attached to e-mail pertaining to this error information.

In step S100-20, the presence/absence of error report output designation is checked. If output of an error report is designated, in step S100-21 the error report is printed out. Similar to the transmission of e-mail concerning error information, the error report output designation can be individually set for each error item and for each time such as the presence/absence of base-line communication and the presence/absence of G3/G4 communication.

In step S100-22, designation of whether image files stored in the storage memory 100-5 are to be erased is checked. If erasure of the image files is designated, the image files stored in the storage memory 100-5 are erased in step S100-3. As in the case of the report output designation, this designation of erasure of image files can also be individually set for each error item and for each item such as the presence/absence of base-line communication and the presence/absence of G3/G4 communication.

In step S100-24, the error processing is completed.

Figure 5:
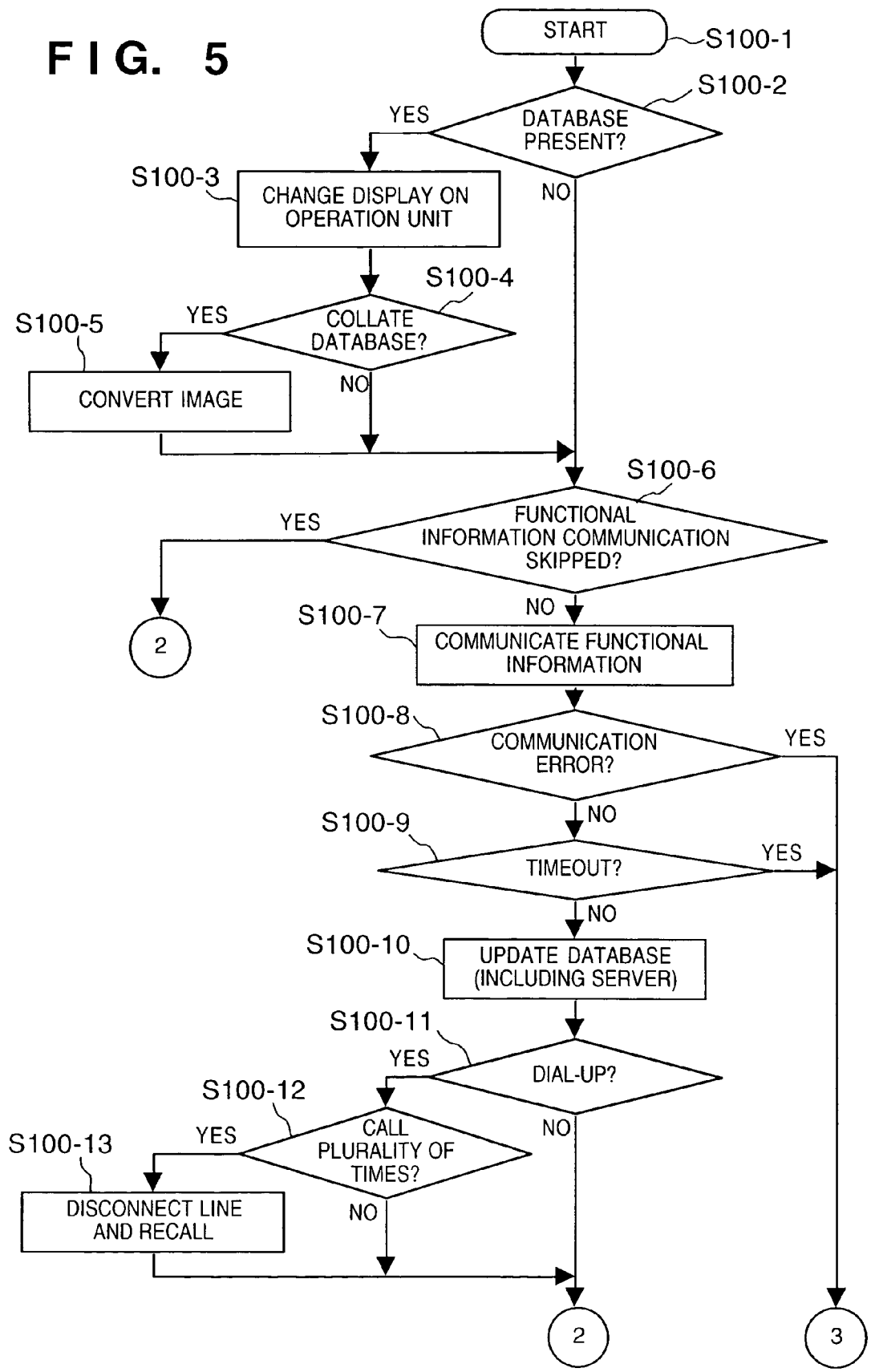
FIG. 5 is a flow chart showing the procedure of communication of e-mail having a facsimile image attached.
Figure 6:
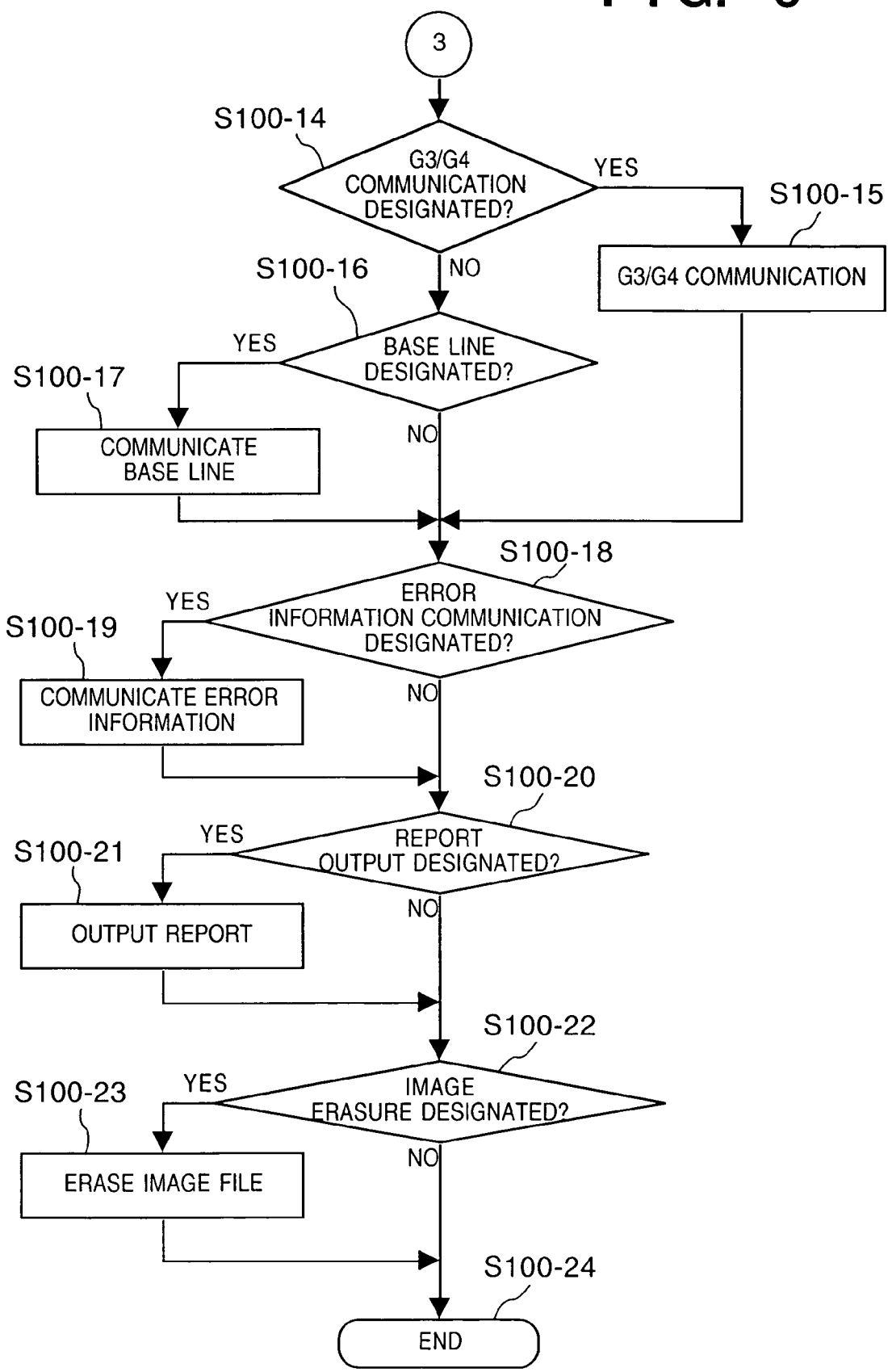
FIG. 6 is a flow chart showing the procedure of communication of e-mail having a facsimile image attached.

A recall flow shown in FIG. 5 will be described below. This recall flow in steps S100-11, S100-12, and S100-13 is used when the e-mail•facsimile exchanging apparatus of this embodiment is connected to the Internet or a local area network by dial-up connection.

If dial-up connection is found in step S100-11, the flow advances to step S100-12 to check whether calling is to be performed a plurality of times designated by software switches. If calling of a plurality of times is designated, in step S100-13 the line is once disconnected after functional information communication is completed and recall is performed to communicate image data.

This can save the charge when, e.g., a certain time is necessary between functional information communication and main image communication. Also, if a dial-up connection is used in the timeout error waiting process in step S100-9, it is possible to once disconnect the line, wait until a designated time elapses, and reconnect the line to detect the presence/absence of timeout.

Figure 7:
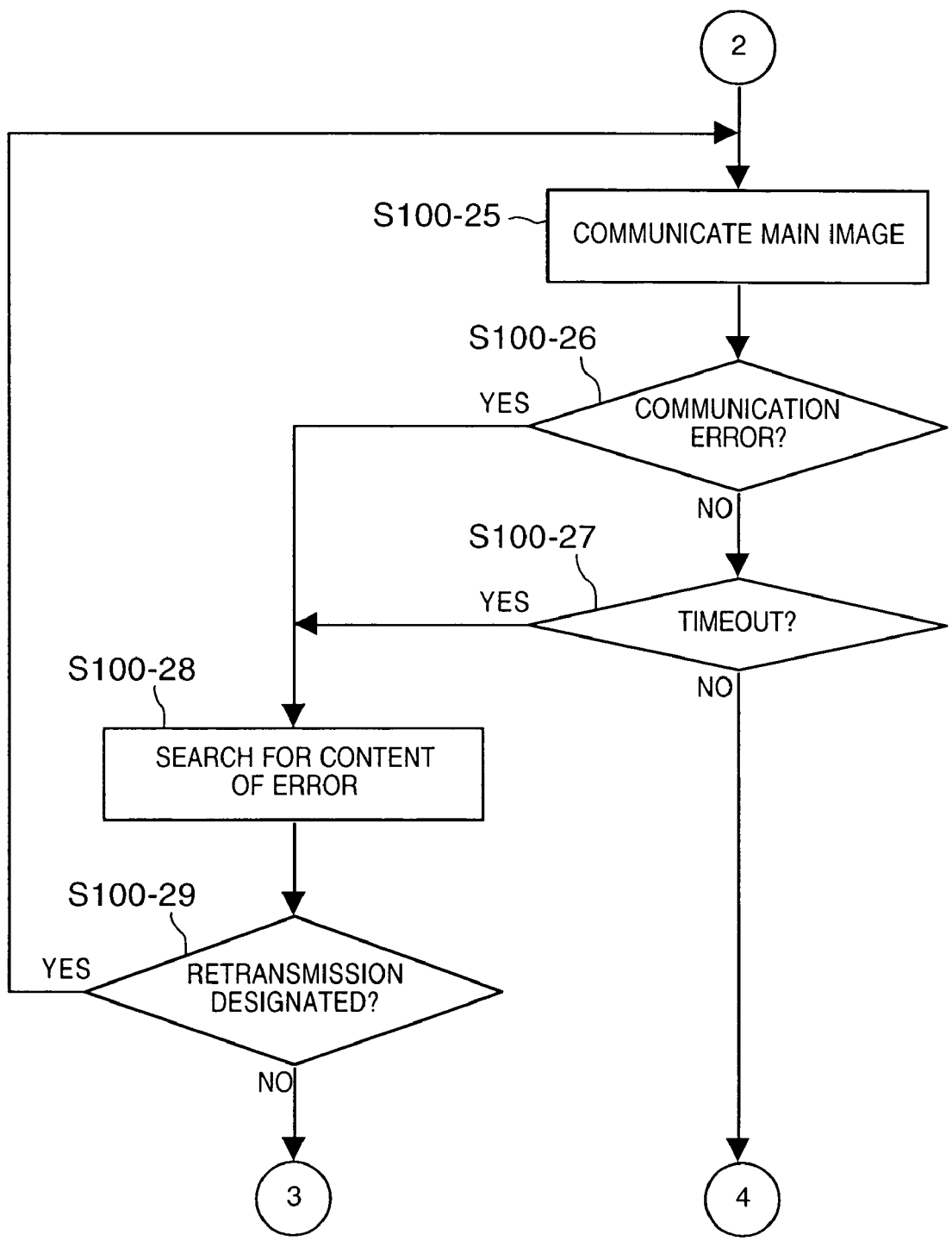
FIG. 7 is a flow chart showing the procedure of communication of e-mail having a facsimile image attached.

If no dial-up connection is found in step S100-11, the flow advances to step S100-25 shown in FIG. 7. In step S100-25, transmission of e-mail having image data attached, i.e., main image communication is performed. If necessary, image conversion is performed on the basis of newly acquired functional information.

Subsequently, a communication error and a timeout error are checked in steps S100-26 and S100-27, respectively. If either error has occurred, the flow branches to step S100-28 to search for retransmission designation and the number of times of retransmission from the contents of the error. If in step S100-29 retransmission is designated and the number of times of retransmission up to the point is less than the designated number of times of retransmission, the flow returns to step S100-25 to retransmit the main image. If retransmission corresponding to the error item is not designated or if a retransmission error has occurred a designated number of times, the flow advances to step S100-14. A flow from this step S100-14 is the same as the flow when an error occurs during functional information communication already described, so a detailed description thereof will be omitted.

Figure 8:
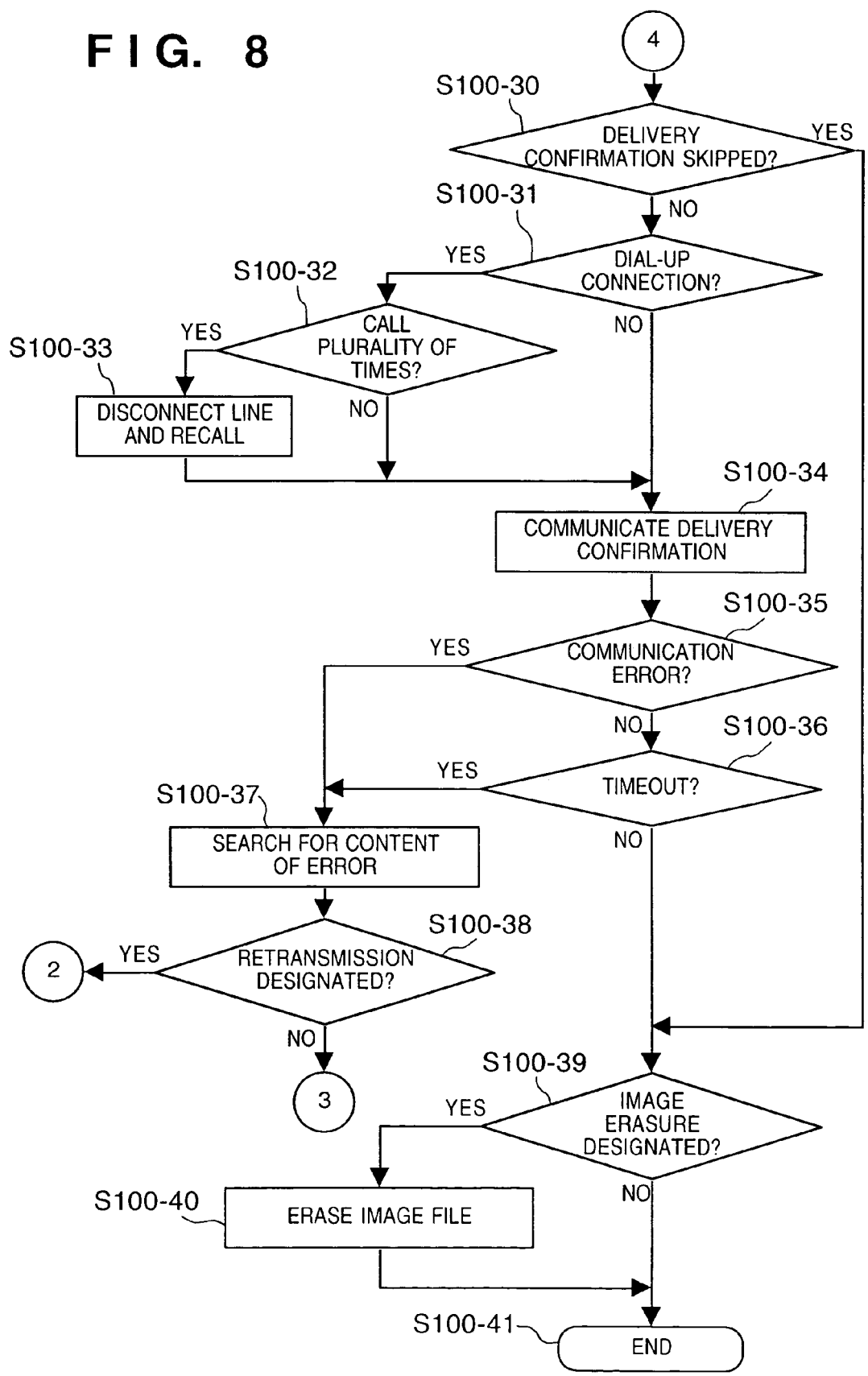
FIG. 8 is a flow chart showing the procedure of communication of e-mail having a facsimile image attached.

If no error occurs in steps S100-26 and S100-27, the flow advances to step S100-30 shown in FIG. 8. In step S100-30, whether delivery confirmation is to be skipped is checked. If no delivery confirmation is necessary, the flow advances to step S100-39 to perform a normal termination process. If in step S100-39 erasure of image file data is designated, in step S100-40 image file data already transmitted and left in the storage memory 100-5 is erased. The flow then advances to step S100-41 to complete the communication.

If delivery confirmation is necessary, the flow advances to step S100-31. If it is found in step S100-31 that the e-mail•facsimile exchanging apparatus of this embodiment is connected to the Internet or a local area network by dial-up connection, the flow advances to step S100-32 as in the case of functional information communication. If it is designated in step S100-32 that retransmission is to be performed a plurality of times designated by another software switch, in step S100-33 the line is once disconnected after communication of the main image data is completed and recall is performed to communicate the image data. Likewise, although not shown in the flow chart, when a dial-up connection is employed, it is possible in the timeout error waiting process in step S100-27 to once disconnect the line, wait until a designated time elapses, and reconnect the line to detect the presence/absence of timeout.

In step S100-34, communication pertaining to delivery confirmation is performed. In steps S100-35 and S100-36, a communication error and a timeout error are detected. As in the above case, when a dial-up connection is employed, it is possible in the timeout error waiting process in step S100-36 to once disconnect the line, wait until a designated time elapses, and reconnect the line to detect the presence/absence of timeout.

If an error or timeout concerning delivery confirmation communication occurs, the flow advances to step S100-37 to search for retransmission designation and the number of times of retransmission from the contents of the error. If in step S100-38 retransmission is designated and the number of times of retransmission up to the point is less than the designated number of times of retransmission, the flow returns to step S100-25 to retransmit the main image. If retransmission corresponding to the error item is not designated or if a retransmission error has occurred a designated number of times, the flow advances to step S100-14. From this step S100-14, the error processing described earlier is performed, and the procedure is completed.

A flow of the formation of a functional information database in one-touch button registration of the e-mail•facsimile exchanging apparatus of this embodiment will be described in detail below with reference to FIG. 9.

First, if in step S200-2 the e-mail address of the destination is set in a one-touch button or abbreviated button, the flow advances to step S200-3 to newly form or update a database corresponding to the e-mail address registered in the one-touch button.

In step S200-3, whether registration concerning functional information is to be performed from the operation unit 100-10 is checked. If this registration is to be performed, the flow advances to step S200-6 to acquire database information by the registration using the operation unit 100-10. The flow then advances to step S200-9 to register and update the database corresponding to the e-mail address registered in the one-touch dial.

Although the process is explained by taking a one-touch button or abbreviated button as an example, this process is similarly applicable to operations such as registration and update of registered e-mail addresses, by which destination names and destination e-mail addresses are stored in one-to-one correspondence with each other. Also, although the formation of a functional information database in one-touch button registration of the e-mail•facsimile exchanging apparatus is described above, the process can be applied to operations such as registration and update of e-mail addresses when an apparatus is constituted by a system including a personal computer and the like. Furthermore, the process is applicable to deletion.

If no registration is performed in step S200-3, the flow advances to step S200-4 to check whether the apparatus is connected to the Internet by dial-up connection in accordance with software switches. If YES in step S200-4, the process is completed by skipping functional information communication and database update from step S200-5. This is to reduce the charge during dial-up connection. When a dial-up connection is employed, each e-mail•facsimile apparatus of this embodiment does not perform functional information communication and registration and update of the database. That is, each apparatus previously instructs an e-mail server at the destination of connection to form a database pertaining to functional information corresponding to the user address of the destination of one-touch registration.

The e-mail server exchanges functional information with respect to collectively newly registered e-mail addresses and registers and updates a database corresponding to the e-mail addresses. The e-mail•facsimile apparatus extracts the database information formed in the e-mail server to form a database corresponding to the e-mail address registered in a one-touch button or an abbreviated button.

If no dial-up connection is employed, the flow advances to step S200-5 to perform communication for functional information. The flow then advances to steps S200-7 and S200-8 to monitor a communication error and timeout during functional information communication. If there is a communication error or timeout, the flow advances to step S200-13 to perform error processing, i.e., display the communication error on the operation unit 100-10 or send e-mail indicating the occurrence of the error to a preset e-mail address. After that, the process is completed. In the case of timeout, the other party may be a system having no functional information exchanging function. If this is the case, a base-line function can be registered as functional information.

When normal functional information is acquired, the flow advances to step S200-9 to newly register or update a database corresponding to the e-mail address. In step S200-10, whether communication of the contents of this database to another e-mail server in the LAN is designated by a software switch is checked. If YES in step S200-10, the flow advances to step S200-11 to transmit to the e-mail server the database corresponding to the e-mail address of the server. On the basis of the contents of the communication, the e-mail server registers or updates a database corresponding to the e-mail address.

Figure 9:
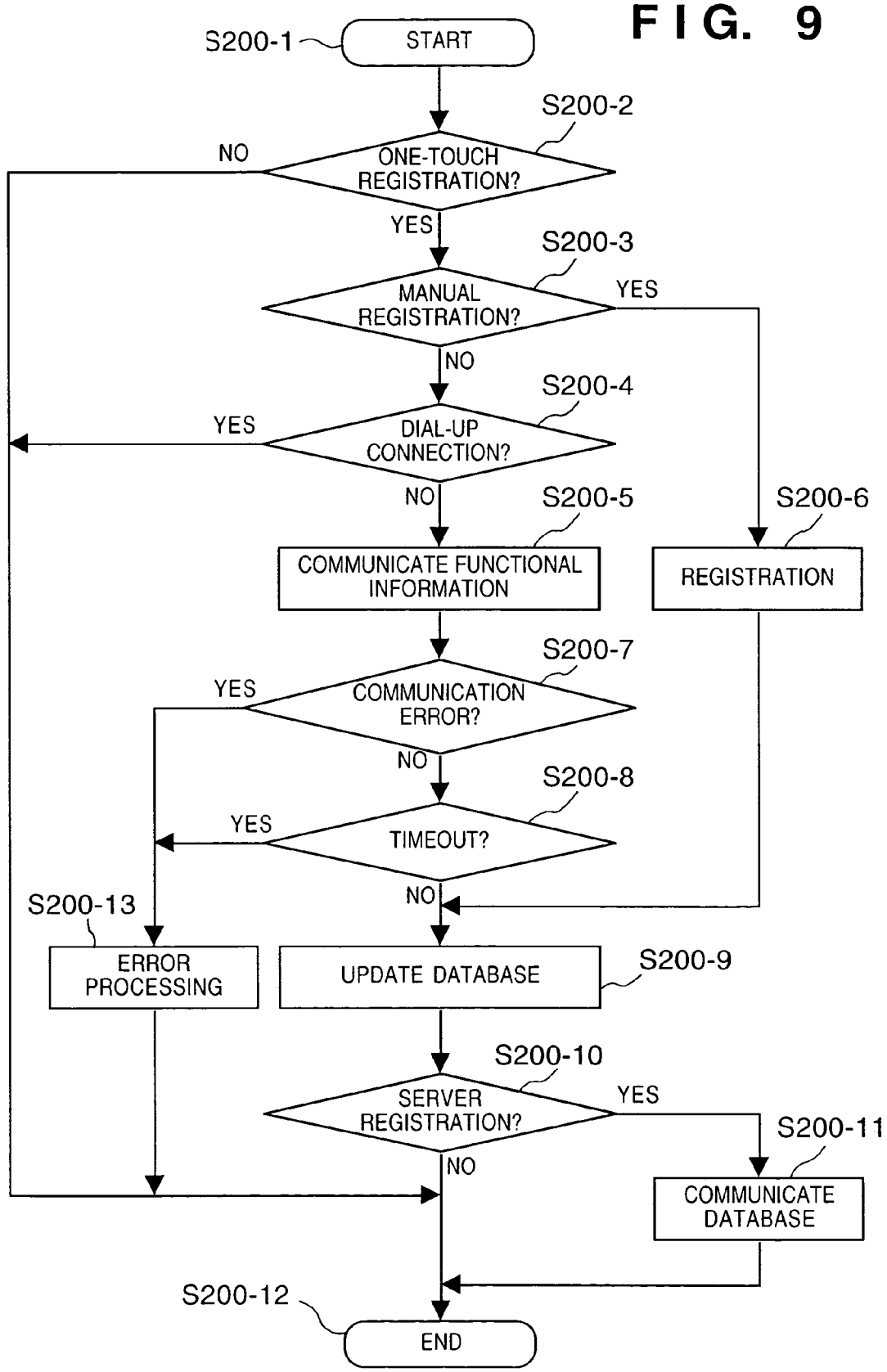
FIG. 9 is a flow chart showing the procedure of formation of a functional information database in one-touch button registration of the e-mail•facsimile exchanging apparatus.
Figure 10:
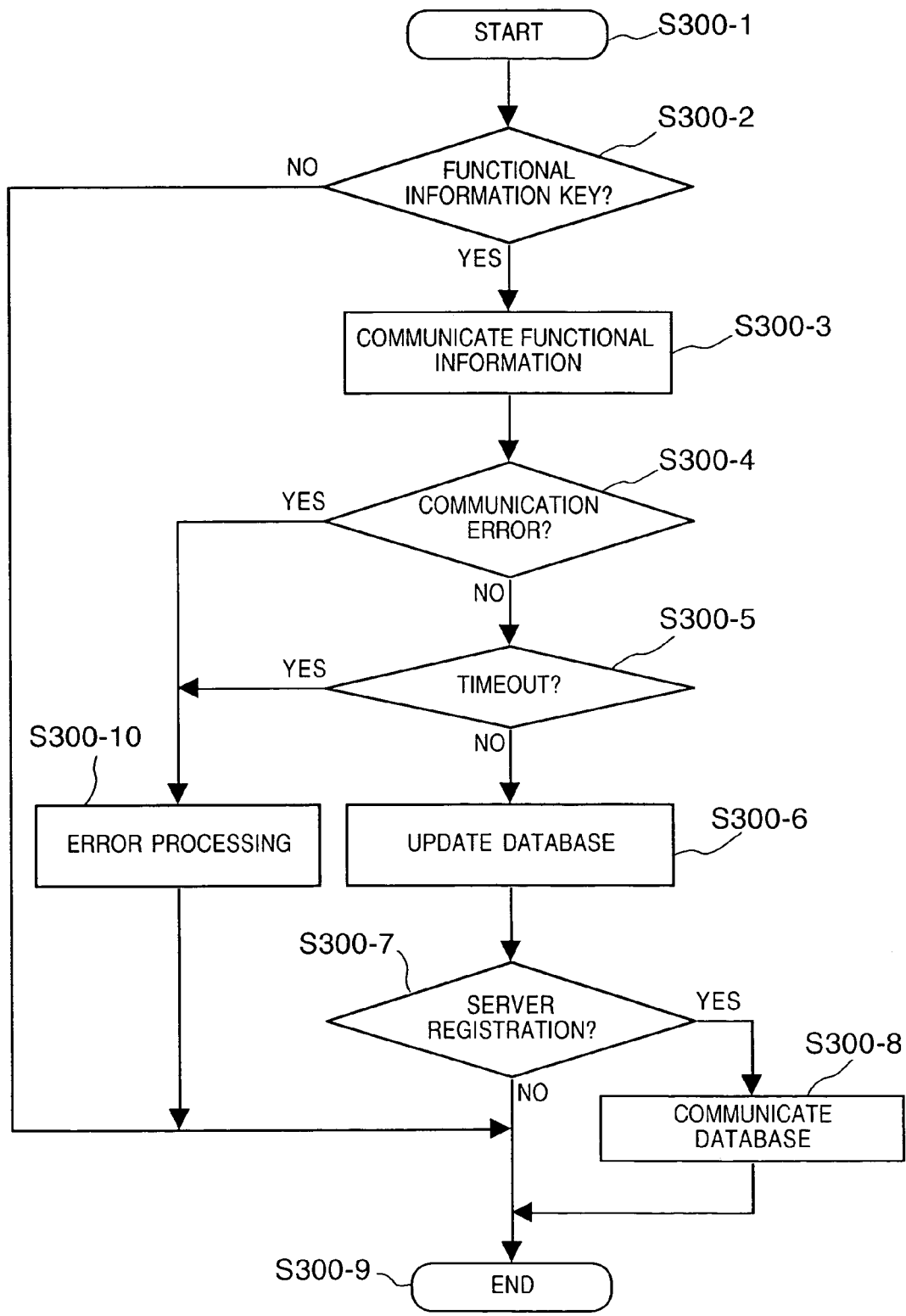
FIG. 10 is a flow chart showing the procedure of acquiring functional information by operating a functional information key of an operation unit.

FIG. 10 is a flow chart when a user acquires functional information by operating a functional information key provided on the operation unit 100-11 separately from one-touch dials and abbreviated dials. If the functional information key is pressed in step S300-2, the flow advances to step S300-3 to communicate functional information to the designated e-mail address and, as in the case of a one-touch dial, register and update a database corresponding to the designated e-mail address and inform the server of the results. Steps from step S300-4 are identical with steps from step S200-7 in FIG. 9. This functional information key is primarily used when a database of e-mail addresses registered by one-touch dials is registered or updated at once, such as when one-touch registrations are collectively performed and communications concerning functional information are collectively performed at a later time, or when a terminal is newly installed.

A procedure of communicating changes in functional information to communication partners registered in one-touch buttons and abbreviated buttons when functional information of an e-mail•facsimile exchanging apparatus is changed by changing software switches of the apparatus will be described below with reference to FIG. 11.

Note that the other parties to be informed of changes in functional information of an apparatus at this end need not be all e-mail addresses registered in one-touch buttons and the like but can be individually designated e-mail addresses. In this flow shown in FIG. 11, when broadcast is performed by changing software switches, functional information of an apparatus at this end is notified to the other party and at the same time functional information of the communication partner apparatus is acquired to update databases, in the apparatus at this end and in an e-mail server, of functional information pertaining to the destination apparatus.

First, if software switches related to functional information of an apparatus are changed, the flow advances to step S400-3. If in step S400-3 communication of functional information resulting from software switch change is designated by a separately set software switch, the flow advances to step S400-4 to communicate the functional information. If there is no designation, the flow advances to step S400-11 to complete the process. A functional information communication flow from step S400-4 is already explained in FIG. 9, so a detailed description thereof will be omitted. If software switches are changed, this change in functional information must be notified to a plurality of destinations. Therefore, in step S400-10 whether communication of functional information to all destinations is completed is monitored. If this communication of functional information to all destinations is not completed, the flow returns to step S400-4 to keep communicating the functional information to the designated addresses until the functional information communication to all destinations is completed.

Figure 11:
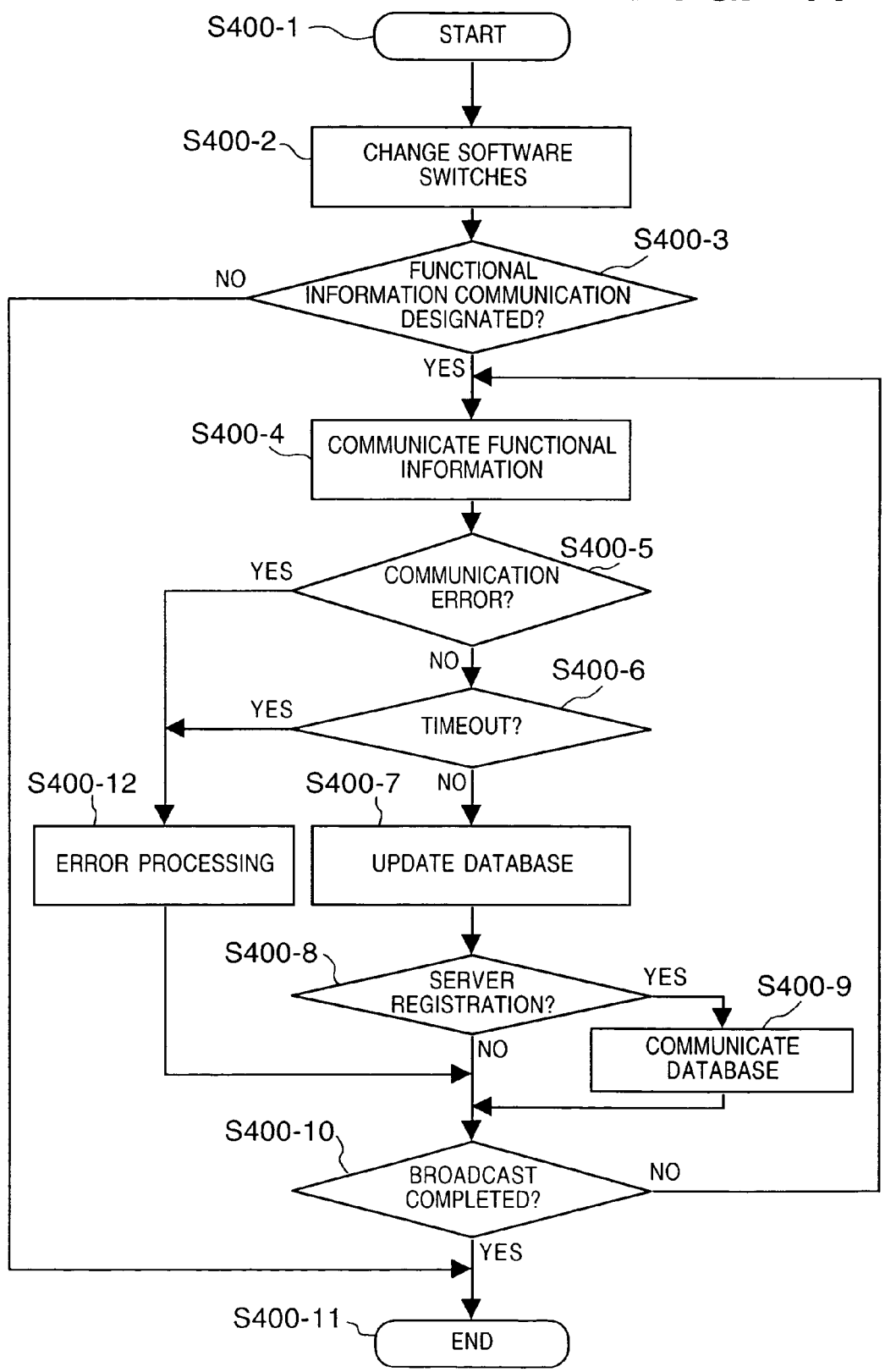
FIG. 11 is a flow chart showing the procedure when a change in functional information is communicated to a communication partner registered in a one-touch button or in an abbreviated button.

Especially when a network is formed in a company or the like, functional information can be well exchanged by forming a database as shown in FIGS. 9, 10, and 11. Accordingly, communication can always be performed for a destination apparatus by optimum functions without exchanging functional information whenever communication is performed. Although not described in FIGS. 9, 10, and 11, this database can also be readily maintained by holding the date and time of update of the database for each registered e-mail address.

As has been explained above, transmitted e-mail is usually once stored in a post office set in an e-mail server. After that, each user or e-mail•facsimile exchanging apparatus extracts the e-mail data from this e-mail server. Therefore, if the e-mail•facsimile exchanging apparatus has no e-mail step SMTP/POP3 server function, a separately set e-mail server must exchange delivery confirmation and exchange functional information in place of the e-mail•facsimile exchanging apparatus. Hence, to set an e-mail server separately from the e-mail•facsimile exchanging apparatus, the capability of the e-mail•facsimile exchanging apparatus as a connection source and a database of functional information pertaining to the communication partner must be set in the e-mail server.

When functional information databases of e-mail•facsimile exchanging apparatuses at this end and at a registered destination change, such as when one-touch registration is performed, the functional information key is pressed, or software switches concerning functional information are changed, as shown in the flow charts of FIGS. 9, 10, and 11, the e-mail•facsimile exchanging apparatus of this embodiment transmits functional information related to the content of the change to an e-mail server having a corresponding post office. This allows the e-mail server to always hold information concerning the latest functional information by updating a corresponding database on the basis of the transmitted functional information. In the case of dedicated-line IP connection as shown in FIG. 2, communication of functional information and delivery confirmation can be performed by an e-mail•facsimile exchanging apparatus, not by an e-mail server.

An e-mail server is connected to a plurality of e-mail users and a plurality of e-mail•facsimile exchanging apparatuses. Therefore, databases of functional information concerning communication partners are transmitted and updated by a plurality of e-mail•facsimile exchanging apparatuses. When this is the case, a functional information database can be shared by all apparatuses in a network by updating and changing the database of each apparatus on the basis of communication pertaining to a database broadcast at a predetermined cycle from an e-mail server connected.

FIGS. 12 and 13 show examples of communication management reports. FIG. 12 shows an example of a communication management report in conventional G3 apparatuses. Each communication result is indicated by "OK" or "NG". FIG. 13 shows an example of a communication management report of the e-mail•facsimile exchanging apparatus of this embodiment. Each communication result is indicated by "OK", "NG", "BaseLine", "awaiting confirmation", or "G3/G4".

Unlike image transmission by G3/G4, communication of e-mail having image data attached takes time for a response to delivery confirmation communication. This frequently occurs when individual apparatuses are connected by dial-up. In the e-mail•facsimile apparatus of this embodiment, therefore, "awaiting acknowledgement" is added to the communication result report to inform the user of the status in which communication of main image data is completed but delivery confirmation is being awaited.

Also, as described previously, to communicate e-mail having image data attached to a destination apparatus having no functional information, the e-mail must be forcedly converted into a base-line image format before transmission. To notify a user of this information, "BaseLine" is added to the results of communication management in the e-mail•facsimile exchanging apparatus of this embodiment.

Furthermore, the e-mail•facsimile exchanging apparatus of this embodiment has a transfer communication function for automatically communicating image data by using the G3/G4 protocol if e-mail having an image attached cannot be transmitted owing to a communication error. To notify a user of this information, "G3/G4" indicating that G3/G4 communication has been performed is added to the results of communication management.

In the e-mail•facsimile exchanging apparatus of this embodiment, means for acquiring these communication management reports are as follows. That is, in accordance with any of an instruction by a user from the operation unit 100-10, an external instruction via the LAN I/F unit 100-6 or the line I/F unit 100-7, and timer designation, the CPU 100-2 bitmaps communication management information into image data by using the fonts in the ROM 100-3 and causes the printer unit 100-9 to print out the data. Alternatively, under the control of the CPU 100-2 e-mail of communication management report information is formed and communicated to a designated e-mail address.

Further, the present invention includes a case in which program codes of software for realizing the functions of the abovementioned embodiment are supplied to an internal computer of a system or apparatus connected to various devices so as to operate these devices to realize the functions of the embodiment, and these various devices are operated in accordance with the program stored in the computer (CPU or MPU) of the system or apparatus.

In this case, the program codes of the software accomplish the functions of the above embodiment, so the program codes themselves and a means for supplying the program codes to the computer, e.g., a storage medium storing the program codes, constitute the present invention. As this storage medium for storing the program codes, it is possible to use, e.g., a floppy disk, a hard disk, an optical disk, a magnetooptical disk, a CD-ROM, a CD-R, a magnetic tape, a nonvolatile memory card, and a ROM.

Furthermore, besides aforesaid functions according to the above embodiment are realized by executing the program codes by the computer, the present invention includes a case where the program codes achieve the functions of the embodiment in collaboration with an OS (Operating System) or some other application software running on the computer. The embodiment of the present invention naturally includes such program codes.

Furthermore, the present invention also includes a case where, after the supplied program codes are stored in a memory of a function extension board inserted into the computer or of a function extension unit connected to the computer, a CPU or the like of the function extension board or function extension unit performs a part or the whole of actual processing on the basis of instructions from the program codes and realizes the functions of the above embodiment.

The e-mail•facsimile exchanging apparatus of this embodiment can exchange functional information by an optimum method in accordance with the form of connection to the Internet. Accordingly, in communication of facsimile images using e-mail, the capability of each apparatus function can be maximally utilized. This allows transmission/reception of information most effective to relay or broadcast to apparatuses having the G3 or G4 protocol.

This embodiment also provides a delivery confirmation exchanging means to an e-mail•facsimile exchanging apparatus capable of communication in e-mail form. Therefore, it is possible to implement a communication apparatus capable of communication result acknowledgement, equivalent to that in facsimile communication using a public network, while recognizing the features of a network used by a user. Additionally, in e-mail data communication it is possible to distinguish between information indicating that base-line communication having no delivery confirmation information function and communication of image information are successful, and information indicating that the communication result of image information is unverified, in accordance with the status of arrival of delivery confirmation information. This can provide a user-friendly apparatus. Also, in e-mail data communication, it is possible to distinguish between information about the result of base-line communication having no delivery confirmation information function and information about the result of communication having the delivery confirmation function.

As has been described above, the e-mail•facsimile exchanging apparatus of this embodiment can exchange functional information by an optimum method in accordance with the form of connection to the Internet. Accordingly, in communication of facsimile images using e-mail, the capability of each apparatus function can be maximally utilized. This allows exchange of information most effective to relay or broadcast to apparatuses having the G3 or G4 protocol.

This embodiment provides an e-mail•facsimile exchanging apparatus capable of communication in e-mail form with a database of information concerning a communication partner and functional information by optimum means in accordance with the form of connection to the Internet of an apparatus at each of the transmitting and receiving ends and with the installation state of e-mail server. Therefore, it is possible to realize image data communication equivalent to facsimile communication using a public network on e-mail communication, eliminate the labor of exchanging functional information whenever communication is performed, and perform rapid communication matching the capability of the other party.

Furthermore, when registration and update are performed for e-mail addresses frequently used by a user such as an e-mail address book function which stores one-touch buttons or abbreviated-buttons, destination names, and destination e-mail addresses in one-to-one correspondence with each other, communication concerning functional information is performed with respect to the registered destination apparatus and the result is stored in one-to-one correspondence with the registered e-mail address. This eliminates the labor of exchanging functional information whenever the text of e-mail is communicated and allows rapid text communication matching the capability of the other party.

Additionally, whether communication pertaining to functional information is to be performed with respect to the destination apparatus is set in accordance with whether the connection to the Internet is dial-up connection or dedicated-line IP connection. This permits a user to reduce the charge in dial-up connection.

If it is possible that the other party is a system having no functional information exchanging function, functional information of a base line is registered. This eliminates the labor of exchanging functional information whenever the text of e-mail is communicated and allows rapid text communication matching the capability of the other party.

Also, the contents of a functional information database are shared by other apparatuses. This eliminates the labor of exchanging functional information and allows rapid text communication matching the capability of the other party.

Further, the contents of a functional information database are transferred whenever the database is updated or at any arbitrary timing, thereby allowing the latest database contents to be shared by other apparatuses at any time. This eliminates the labor of exchanging functional information whenever communication is performed and allows rapid text communication matching the capability of the other party.

Functional information can be collectively acquired from an e-mail server for performing a distribution process. This makes efficient acquisition of functional information feasible, eliminates the labor of exchanging functional information, and allows rapid text communication matching the capability of the other party.

Furthermore, when e-mail is to be distributed by requesting an e-mail server to do so, delivery confirmation is returned at the time the e-mail arrives at the distribution server. Therefore, a user can be rapidly informed of the transmission result. When information is important, a user can select a return of delivery confirmation performed at the time the information is certainly distributed to the distribution destination. Accordingly, it is possible to add a user-friendly function convenient for a user.

As many apparently widely different embodiments of the present invention can be made without departing from the spirit and scope thereof, it is to be understood that the invention is not limited to the specific embodiments thereof except as defined in the appended claims.

What is claimed is:

1. A communication apparatus for transmitting electronic mail data by connecting to the Internet, the apparatus comprising:
designation means for designating a destination address for transmission of the electronic mail;
determination means for determining a format of image data in correspondence with the designated destination address by referring to a database for storing functional information of destination devices, in a case where transmission of the electronic mail data with the image data attached thereto is performed;
communication means for, before the transmission of the electronic mail data is performed, and in a case where the determination means determines that the functional information of the format of the image data for the destination device corresponding to the designated destination address is not stored in the database, initiating communication with a destination device corresponding to the designated destination address to obtain functional information of the format of the image data for the destination device;
converting means for i) converting the image data into the format determined by said determination means in a case where the functional information of the format of the image data for the destination device corresponding to the designated destination address is stored in the database, ii) in a case where the determination means determines that the functional information of the format of the image data for the destination device corresponding to the designated destination address is not stored in the database and where said communication means obtains the functional information of the format of the image data in the communication initiated with the destination device, converting the image data into the format of the image data based on the functional information obtained from the destination device by said communication means, and iii) in a case where the determination means determines that the functional information of the format of the image data for the destination device corresponding to the destination address is not stored in the database, and where said communication means does not obtain the functional information of the format of the image data in the communication initiated with the destination device, converting the image data into a predetermined standard image format; and
transmission means for transmitting the electronic mail data with the image data which is converted by said converting means to the destination device corresponding to the designated destination address.

2. The apparatus according to claim 1, wherein the functional information is information indicating at least one of a coding system, resolution, and original length.

3. A communication apparatus comprising:
designation means for designating a destination address for transmission of electronic mail;
first connecting means for connecting to a local area network and second connecting means for connecting to a wide area network;
first communicating means for communicating electronic mail data by connecting to the Internet by one of said first and second connecting means;
second communicating means for performing facsimile communication by connecting to the wide area network by said second connecting means;
determination means for determining a format of image data in correspondence with the designated destination address by referring to a database for storing functional information of destination devices, in a case where transmission of the electronic mail data with the image data attached thereto is performed;
control means for controlling said first communication means so as to, before the transmission of the electronic mail data is performed, and in a case where the determination means determines that the functional information of the format of the image data for a destination device corresponding to the designated destination address is not stored in the database, initiating communication with the destination device corresponding to the designated destination address to obtain functional information of the format of the image data for the destination device;
converting means for i) converting the image data into the format determined by said determination means in a case where the functional information of the format of the image data for the destination device corresponding to the designated destination address is stored in the database, ii) in a case where the determination means determines that the functional information of the format of the image data for the destination device corresponding to the designated destination address is not stored in the database and where said first communication means obtains the functional information of the format of the image data in the communication initiated with the destination device, converting the image data into the format of the image data for the destination device based on the functional information obtained from the destination device by said first communication means, and iii) in a case where the determination means determines that the functional information of the format of the image data for the destination device corresponding to the destination address is not stored in the database and where said first communication means does not obtain the function information of the format of the image data in the communication initiated with the destination device, converting the image data into a predetermined standard image format; and transmission means for transmitting the electronic mail data with the image data which is converted by said converting means to the destination device corresponding to the designated destination address.

4. The apparatus according to claim 3, wherein if an error occurs in the transmission of image data by said transmission means, retransmission is performed by selecting a number of times of retransmission from a plurality of individually preset number of times of retransmission including zero, in accordance with contents of the error.

5. The apparatus according to claim 4, wherein no retransmission is performed if the contents of the error indicate that there is no destination address.

6. The apparatus according to claim 3, wherein if an error occurs in the transmission of image data by said transmission means, electronic mail data describing information concerning error information is transmitted to said destination device or a previously designated electronic mail address.

7. The apparatus according to claim 6, wherein if an error occurs in the transmission of the image data by said transmission means, electronic mail data having the image data attached is transmitted to a previously designated electronic mail address.

8. The apparatus according to claim 3, wherein the predetermined standard format is an MH coding system considered to be essential of functional information defined by ITU-T T.30, by which a resolution in a main scan direction is 8 pels/mm, a resolution in a sub-scan direction is 3.85 lines/mm, and an original width is 208 mm of A4 size.

9. The apparatus according to claim 3, wherein if connection to said first communicating means is a dial-up connection, communication of the functional information and the transmission of image data are successively performed by a single call.

10. The apparatus according to claim 9, wherein if connection to said first communicating means is a dial-up connection, a line is once disconnected to wait for timeout processing in communication.

11. The apparatus according to claim 9, wherein if connection to said first communicating means is a dial-up connection, a line is once disconnected to wait for timeout processing in communication, and timeout is selectively verified by recall.

12. The apparatus according to claim 3, wherein if connection to said first communicating means is a dial-up connection, communication of the functional information and the transmission of image data are separately performed by at least two calls.

13. The apparatus according to claim 3, wherein if connection to said first communicating means is a dial-up connection, communication of the functional information and the transmission of image data are successively performed by a single call or separately performed by different calls.

14. The apparatus according to claim 3, wherein functional information of a destination apparatus is acquired by communication using one of said first and second communicating means, a database for holding a maximum capability supported by each function is registered or updated, and, if said first communicating means is to communicate data, the data is converted into a standard registered in said database and communicated.

15. The apparatus according to claim 14, wherein whether image data pertaining to said database is to be converted is set for each function item registered in said database.

16. The apparatus according to claim 14, wherein if an address of another party with respect to said first communicating means is input, display information related to functional information is switched on an operation panel based on information in said database.

17. The apparatus according to claim 3, wherein if a communication error occurs in said first communicating means, said second communicating means communicates the image data if communication by said second communicating means is designated and a telephone number of another party is set.

18. The apparatus according to claim 3, further comprising means for acquiring function identification information of a transmission destination by looking up a database stored in connection with functional information in an electronic mail server connected by a dial-up connection.

19. The apparatus according to claim 3, wherein when said first communicating means is to perform communication of the functional information, of pieces of functional information defined by ITU-T T.30, functional information pertaining to communication such as a handshake rate, a modem rate, a minimum transmission time, the presence/absence of error correction mode, and the presence/absence of G4 function need not be exchanged.

20. The apparatus according to claim 3, wherein the functional information is information indicating at least one of a coding system, resolution, and original length.

21. A computer-readable storage medium storing a program for causing a computer to execute a program comprising the steps of:

a designation procedure of designating a destination address for transmission of the electronic mail;

a first connecting procedure of connecting to a local area network and a second connecting procedure of connecting to a wide area network;

a first communication procedure of communicating electronic mail data to the destination address by connecting to the Internet by one of the first or second connecting procedures;

a second communication procedure of performing facsimile communication by connecting to the wide area network by the second connecting procedure;

a determination procedure of determining a format of image data corresponding to the designated destination address by referring to a database for storing functional information of destination devices, in a case where transmission of the electronic mail data with the image data attached thereto is performed;

a control procedure of controlling the first communication procedure so as to, before the transmission of the electronic mail data is performed, and in a case where the determination procedure determines that the functional information of the format of the image data for a destination device corresponding to the designated destination address is not stored in the database, initiating communication with the destination device corresponding to the designated destination address to obtain functional information of the format of the image for the destination device;

a converting procedure of i) converting the image data into the format determined by said determination procedure in a case where the functional information of the format of the image data for the destination device corresponding to the designated destination address is stored in the database, ii) in a case where the determination procedure determines that the functional information of the format of the image data for the destination device corresponding to the designated destination address is not stored in the database and where said first communication procedure obtains the functional information of the format of the image data in the communication initiated with the destination device, converting the image data into the format of the image data for the destination device based on the functional information obtained from the destination device by said first communication procedure, and iii) in a case where the determination procedure determines that the functional information of the format of the image data for the destination device corresponding to the destination address is not stored in the database, and where said first communication procedure does not obtain the functional information of the format of the image data in the communication initiated with the destination device, converting the image data into a predetermined standard image format; and a transmission procedure of transmitting the electronic mail data with the image data which is converted by the converting procedure to the destination device corresponding to the designated destination address.

22. The storage medium according to claim 21, further comprising performing retransmission, if an error occurs in the transmission of image data by said transmission procedure, by selecting a number of times of retransmission from a plurality of numbers of times of retransmission including zero, which are individually set in advance, in accordance with the contents of the error.

23. The storage medium according to claim 22, further comprising performing no retransmission if the contents of the error indicate that there is no destination address.

24. The storage medium according to claim 21, further comprising transmitting, if an error occurs in the transmission of image data by said transmission procedure, electronic mail data describing information concerning error information to said destination device or to a previously designated electronic mail address.

25. The storage medium according to claim 24, further comprising transmitting, if an error occurs in the transmission of the image data by said transmission procedure, electronic mail data having the image data attached to a previously designated electronic mail address.

26. The storage medium according to claim 21, further comprising performing communication such that the predetermined standard format is an MH coding system considered to be essential of functional information defined by ITU-T T.30, by which a resolution in a main scan direction is 8 gels/mm, a resolution in a sub-scan direction is 3.85 lines/mm, and an original width is 208 mm of A4 size.

27. The storage medium according to claim 21, further comprising successively performing communication of the functional information and the transmission of image data by a single call, if connection by said first communication procedure is a dial-up connection.

28. The storage medium according to claim 27, further comprising once disconnecting a line to wait for timeout processing in communication, if connection by said first communication procedure is a dial-up connection.

29. The storage medium according to claim 27, further comprising once disconnecting a line to wait for timeout processing in communication and selectively verifying the timeout by recall, if connection by said first communication procedure is a dial-up connection.

30. The storage medium according to claim 21, further comprising separately performing communication of the functional information and the transmission of image data by at least two calls, if connection by said first communication procedure is a dial-up connection.

31. The storage medium according to claim 21, further comprising successively performing or separately performing communication of the functional information and the transmission of image data by a single call or by different calls, if connection by said first communication procedure is a dial-up connection.

32. The storage medium according to claim 21, further comprising acquiring functional information of a destination apparatus by communication using one of said first and second communication procedures, registering or updating a database for holding a maximum capability supported by each function, and, if communication is to be performed by said first communication procedure, converting an image standard designated by a user into a standard registered in said database on the basis of information of said database, and communicating the image.

33. The storage medium according to claim 32, further comprising setting whether image data pertaining to said database is to be converted for each function item registered in said database.

34. The storage medium according to claim 32, further comprising switching a display on an operation panel related to functional information based on information in said database, if an address of another party is input in said first communication procedure.

35. The storage medium according to claim 21, communicating image data by said second communication procedure, if a communication error occurs in said first communication procedure and if communication by said second communication procedure is designated and a telephone number of another party is set.

36. The storage medium according to claim 21, further comprising acquiring function identification information of a transmission destination by looking up a database stored in connection with functional information in an electronic mail server connected by a dial-up connection.

37. The storage medium according to claim 21, wherein, when communication of the functional information is to be performed by said first communication procedure, not exchanging, of pieces of functional information defined by ITU-T T.30, functional information pertaining to communication such as a handshake rate, a modem rate, a minimum transmission time, the presence/absence of error correction mode, and the presence/absence of G4 function.

38. The storage medium according to claim 21, wherein the functional information is information indicating at least one of a coding system, resolution, and original length.

39. A communication method of communicating electronic mail data to a destination address by connecting to the Internet, the method comprising:

a designation step of designating a destination address for transmission of the electronic mail;

a determination step of determining a format of image data corresponding to the designated destination address by referring to a database for storing functional information of destination devices, in a case where transmission of the electronic mail data with image data attached thereto is to be performed;

a communication step of, before the transmission of the electronic mail data is performed, and in a case where the determination step determines that the functional information of the format of the image data for the destination device corresponding to the designated destination address is not stored in the database, initiating communication with a destination device corresponding to the designated destination address to obtain functional information of the format of image data for the destination device;

a converting step of i) converting the image data into the format determined by said determination step in a case where the functional information of the format of the image data for the destination device corresponding to the designated destination address is stored in the database, ii) in a case where the determination step determines that the functional information of the format of the image data for the destination device corresponding to the designated destination address is not stored in the database and where said communication step obtains the functional information of the format of the image data in the communication initiated with the destination device, converting the image data into the format of the image data for the destination device based on the functional information obtained from the destination device by said communication step, and iii) in a case where the determination step determines that the functional information of the format of the image data for the destination device corresponding to the destination address is not stored in the database, and where said communication step does not obtain the functional information of the format of the image data in the communication initiated with the destination device, converting the image data into a predetermined standard image format; and a transmission step of transmitting the electronic mail data with the image data which is converted by the converting step to the destination device corresponding to the designated destination address.

40. The method according to claim 39, wherein the functional information is information indicating at least one of a coding system, resolution, and original length.

41. A communication system for communication of electronic mail data by a plurality of communication apparatuses connected to the Internet, comprising:

designating means for designating a destination apparatus for transmission of electronic mail;

determination means for determining a format of image data corresponding to the designated destination apparatus by referring to a database for storing functional information of destination apparatuses in a case where transmission of the electronic mail data with image data attached thereto is to be performed between the plurality of communication apparatuses;

communication means for, before the transmission of the electronic mail data is performed, and in a case where the determination means determines that the functional information of the format of the image data for the destination apparatus corresponding to the destination address is not stored in the database, initiating communication with the destination apparatus corresponding to the destination address to obtain functional information of the format of image data for the destination apparatus;

converting means for i) converting the image data into the format determined by said determination means in a case where the functional information of the format of the image data for the destination apparatus corresponding to the designated destination address is stored in the database, ii) in a case where the determination means determines that the functional information of the format of the image data for the destination apparatus corresponding to the designated destination address is not stored in the database and where said communication means obtains the functional information of the format of the image data in the communication initiated with the destination apparatus, converting the image data into the format of the image data for the destination apparatus based on the functional information obtained from the destination device by said communication means, and iii) in a case where the determination means determines that the functional information of the format of the image data for the destination apparatus corresponding to the destination address is not stored in the database and where said communication means does not obtain the function information of the format of the image data in the communication initiated with the destination apparatus, converting the image data into a predetermined standard image format; and transmitting means for transmitting the electronic mail data with the image data which is converted by the converting means to the destination apparatus corresponding to the designated destination address.

42. The system according to claim 41, wherein the functional information is information indicating at least one of a coding system, resolution, and original length.

* * * * *

UNITED STATES PATENT AND TRADEMARK OFFICE
CERTIFICATE OF CORRECTION

| | | |
|---|---|---|
| PATENT NO. | : 7,366,757 B1 | Page 1 of 1 |
| APPLICATION NO. | : 09/588683 | |
| DATED | : April 29, 2008 | |
| INVENTOR(S) | : Ushida | |

It is certified that error appears in the above-identified patent and that said Letters Patent is hereby corrected as shown below:

COLUMN 20:
    Line 51, in Table 1, "V.34" second occurrence should be deleted and included in "(functional information is exchanged by V.34 not by T30)".

COLUMN 21:
    Line 36, "e-ma l•facsimile" should read -- e-mail-facsimile --.

COLUMN 23:
    Line 45, "G3/G3" should read -- G3/G4 --.

COLUMN 29:
    Line 54, "besides" should read -- besides the fact that the --.

COLUMN 35:
    Line 63, "gels/mm," should read -- pels/mm, --.

Signed and Sealed this
Sixteenth Day of August, 2011

David J. Kappos
*Director of the United States Patent and Trademark Office*